United States Patent
Kim et al.

(10) Patent No.: US 9,942,838 B2
(45) Date of Patent: Apr. 10, 2018

(54) METHOD AND DEVICE FOR DISCOVERY OPERATION OF UE IN WIRELESS COMMUNICATION SYSTEM

(71) Applicant: LG ELECTRONICS INC., Seoul (KR)

(72) Inventors: Dongsoo Kim, Seoul (KR); Sunghoon Jung, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/400,828

(22) Filed: Jan. 6, 2017

(65) Prior Publication Data

US 2017/0201934 A1    Jul. 13, 2017

Related U.S. Application Data

(60) Provisional application No. 62/276,175, filed on Jan. 7, 2016.

(51) Int. Cl.
*H04W 48/16* (2009.01)
*H04W 48/18* (2009.01)
(Continued)

(52) U.S. Cl.
CPC .......... *H04W 48/16* (2013.01); *H04W 8/005* (2013.01); *H04W 48/18* (2013.01); *H04W 72/12* (2013.01); *H04W 76/023* (2013.01); *H04W 92/18* (2013.01)

(58) Field of Classification Search
CPC ... H04W 76/023; H04W 8/005; H04W 88/04; H04W 92/18; H04W 72/12; H04W 24/00;
(Continued)

(56) References Cited

U.S. PATENT DOCUMENTS

| 2015/0043448 | A1* | 2/2015 | Chatterjee | ............ H04W 8/005 370/329 |
| 2015/0264663 | A1* | 9/2015 | Chen | ................... H04W 76/023 455/450 |

(Continued)

*Primary Examiner* — Charles Appiah
*Assistant Examiner* — Margaret G Mastrodonato
(74) *Attorney, Agent, or Firm* — Lee Hong Degerman Kang Waimey

(57) ABSTRACT

A method and device for a discovery operation of User Equipment (UE) in a wireless communication system are provided. The method in which a network node supports a discovery operation of a UE includes: receiving, by a network node within a Home Public Land Mobile Network (HPLMN) of the UE, a Discovery Request message from the UE, wherein the Discovery Request message includes a candidate frequency list including an available plurality of carrier frequencies for announcing by the UE and an announcing PLMN ID including a PLMN Identifier (ID) of each of the carrier frequencies included in the candidate frequency list; and transmitting, by the network node within the HPLMN, a Discovery Response message to the UE, wherein the Discovery Response message includes carrier frequency information that indicates a carrier frequency selected for announcing by the UE among the carrier frequencies included in the candidate frequency list.

20 Claims, 22 Drawing Sheets

(51) Int. Cl.
*H04W 8/00* (2009.01)
*H04W 72/12* (2009.01)
*H04W 92/18* (2009.01)
*H04W 76/02* (2009.01)

(58) Field of Classification Search
CPC ..... H04W 48/20; H04W 24/08; H04W 92/16; H04W 72/04; H04W 48/16; H04W 48/18
See application file for complete search history.

(56) References Cited

U.S. PATENT DOCUMENTS

2016/0014590 A1\* 1/2016 Agiwal ................ H04W 8/005
 455/426.1
2016/0014835 A1\* 1/2016 Wu .................... H04W 76/023
 370/329

\* cited by examiner

[FIG. 1]
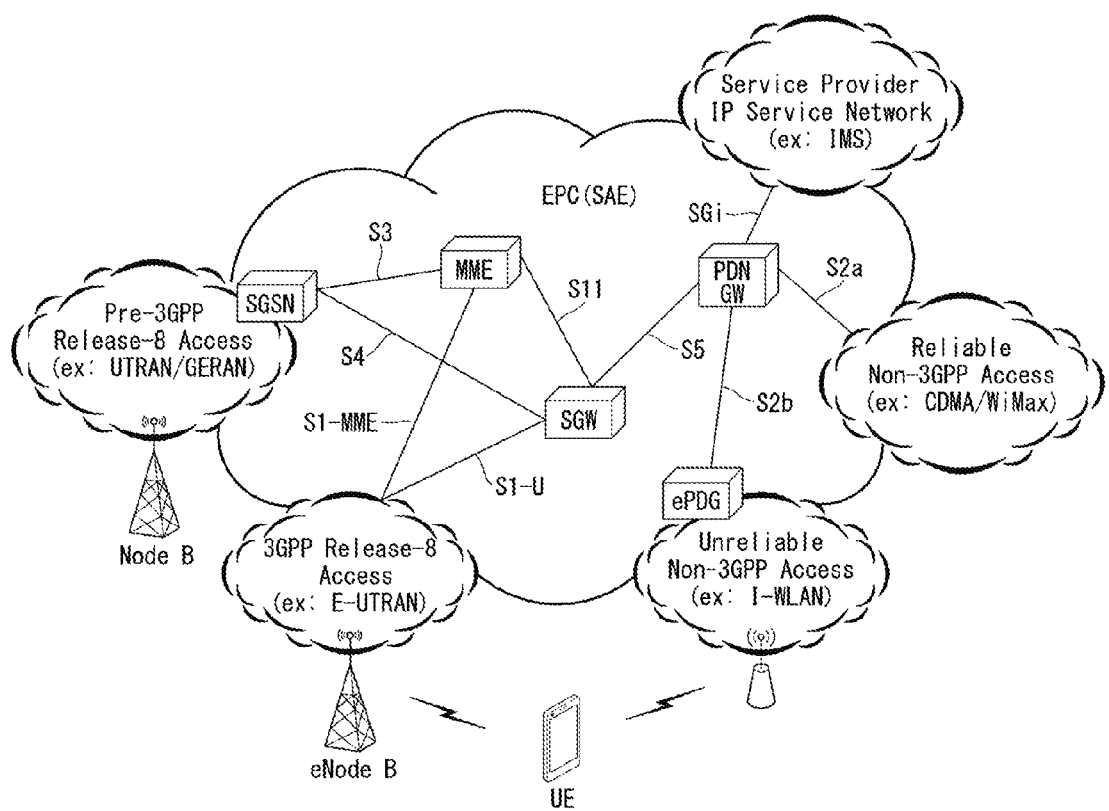

[FIG. 2]
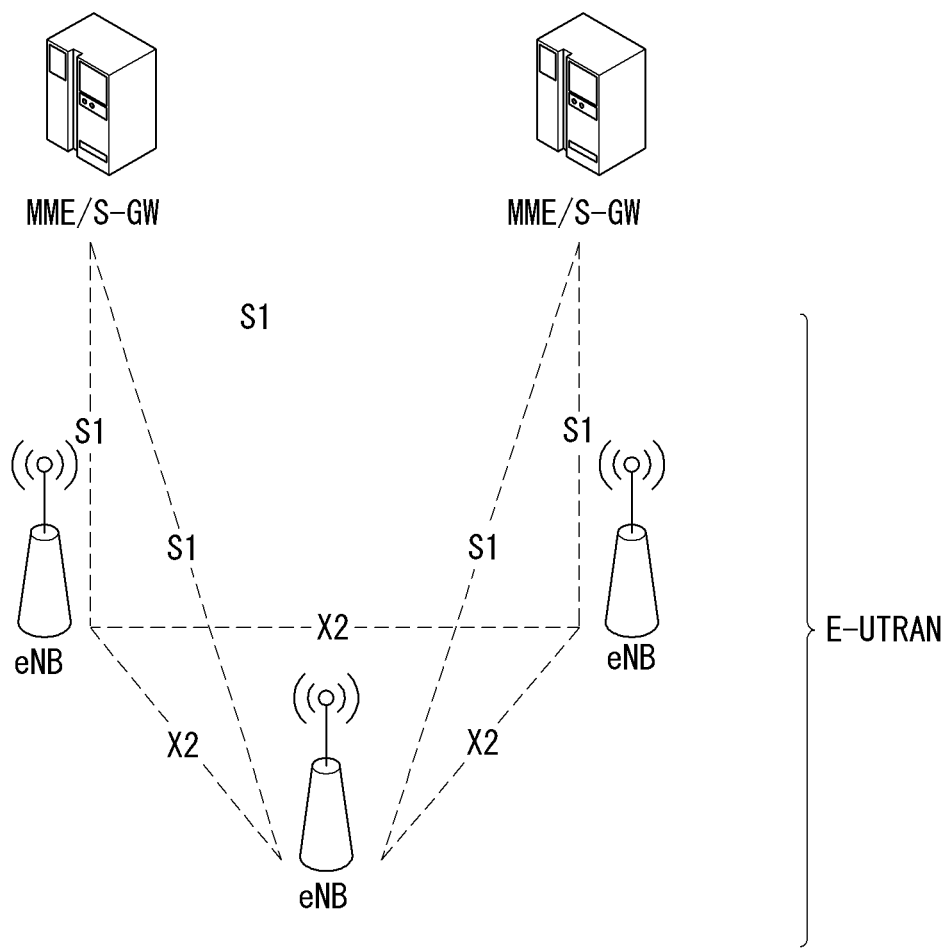

[FIG. 3]
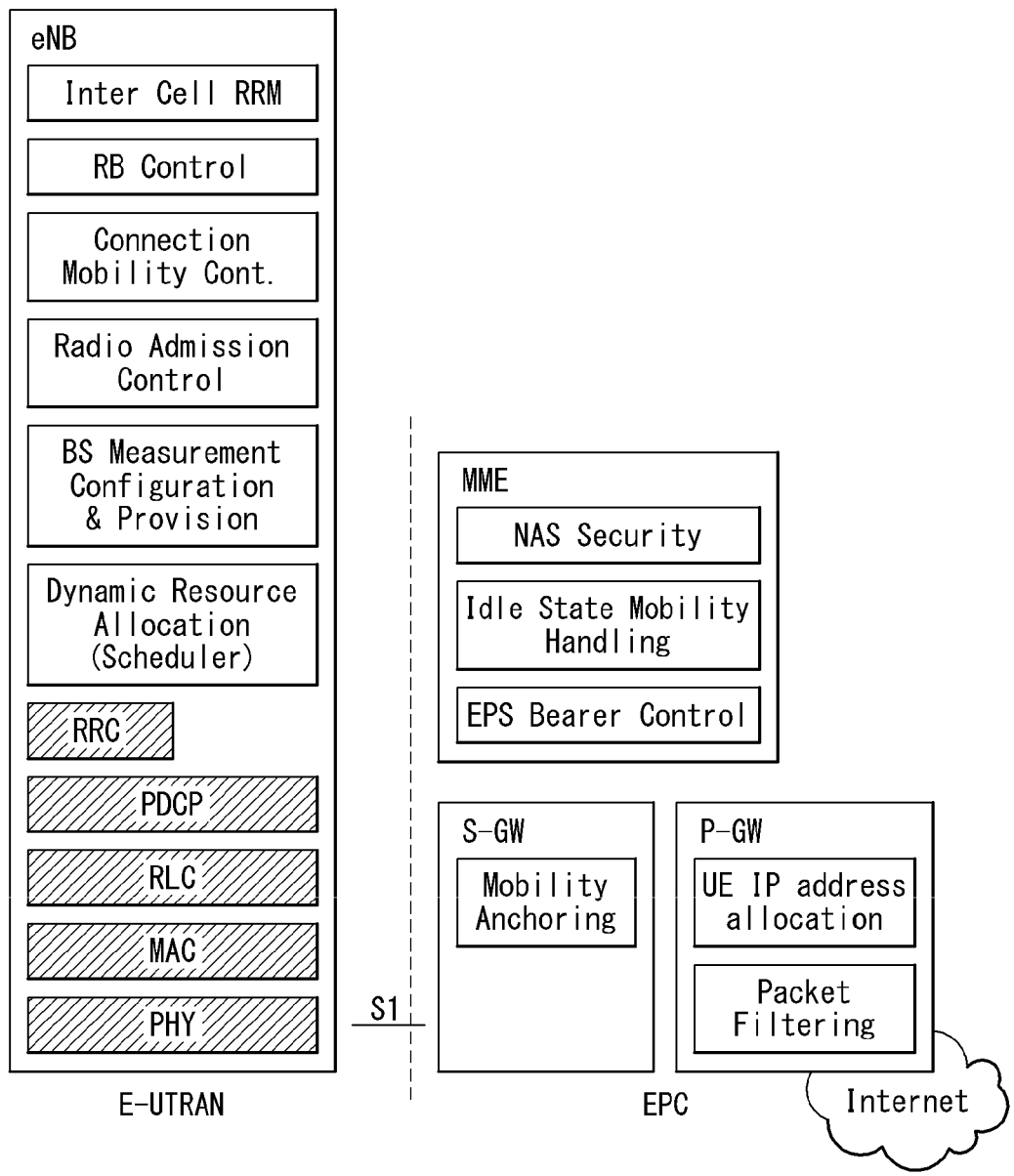

[FIG. 4]
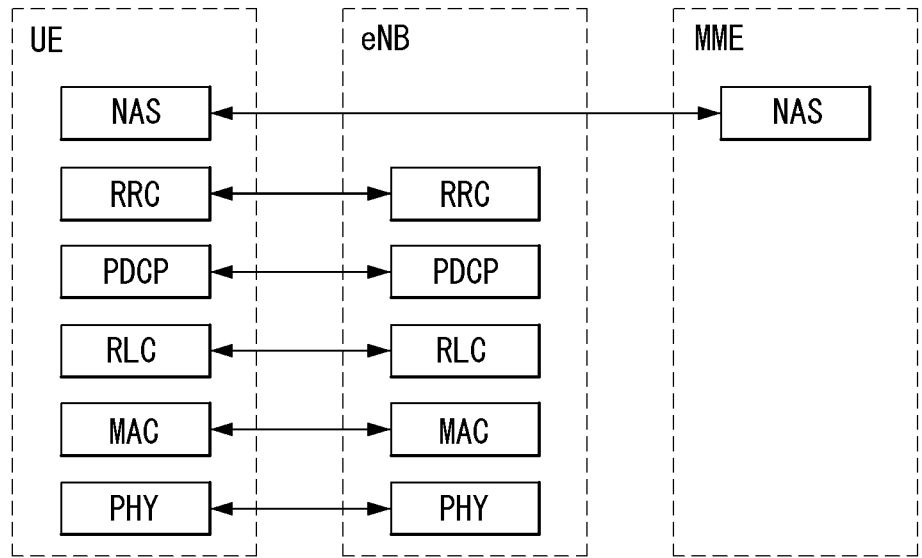
(a) Control Plane Protocol Stack
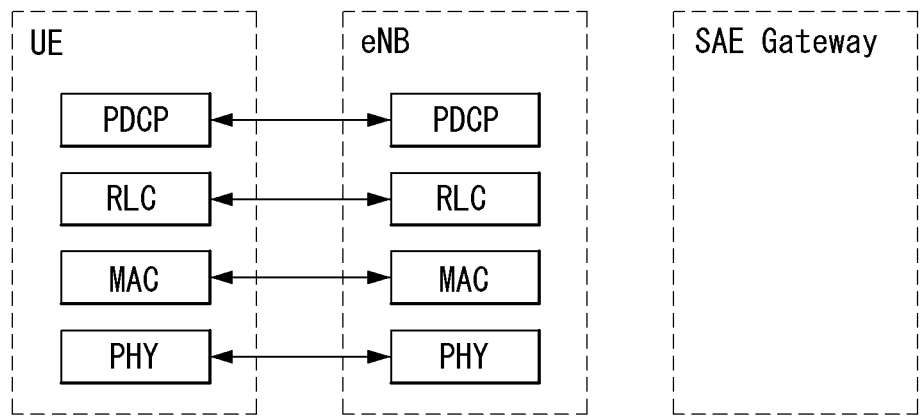
(b) User Plane Protocol Stack

[FIG. 5]
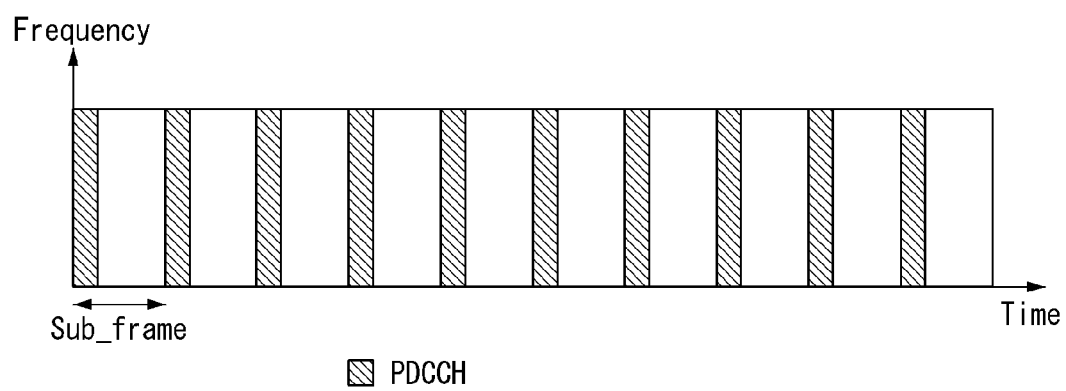

[FIG. 6]
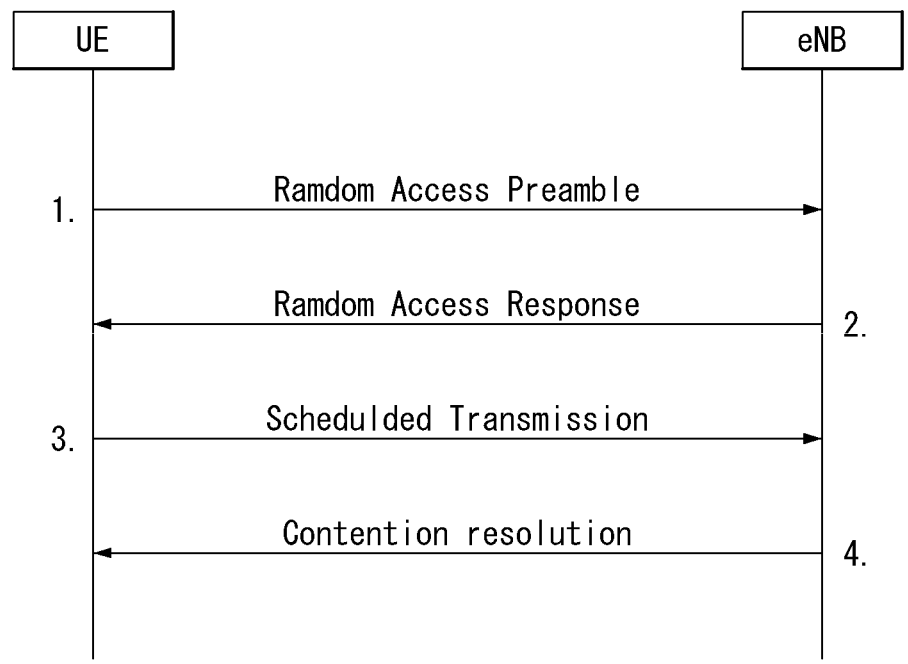

[FIG. 7]
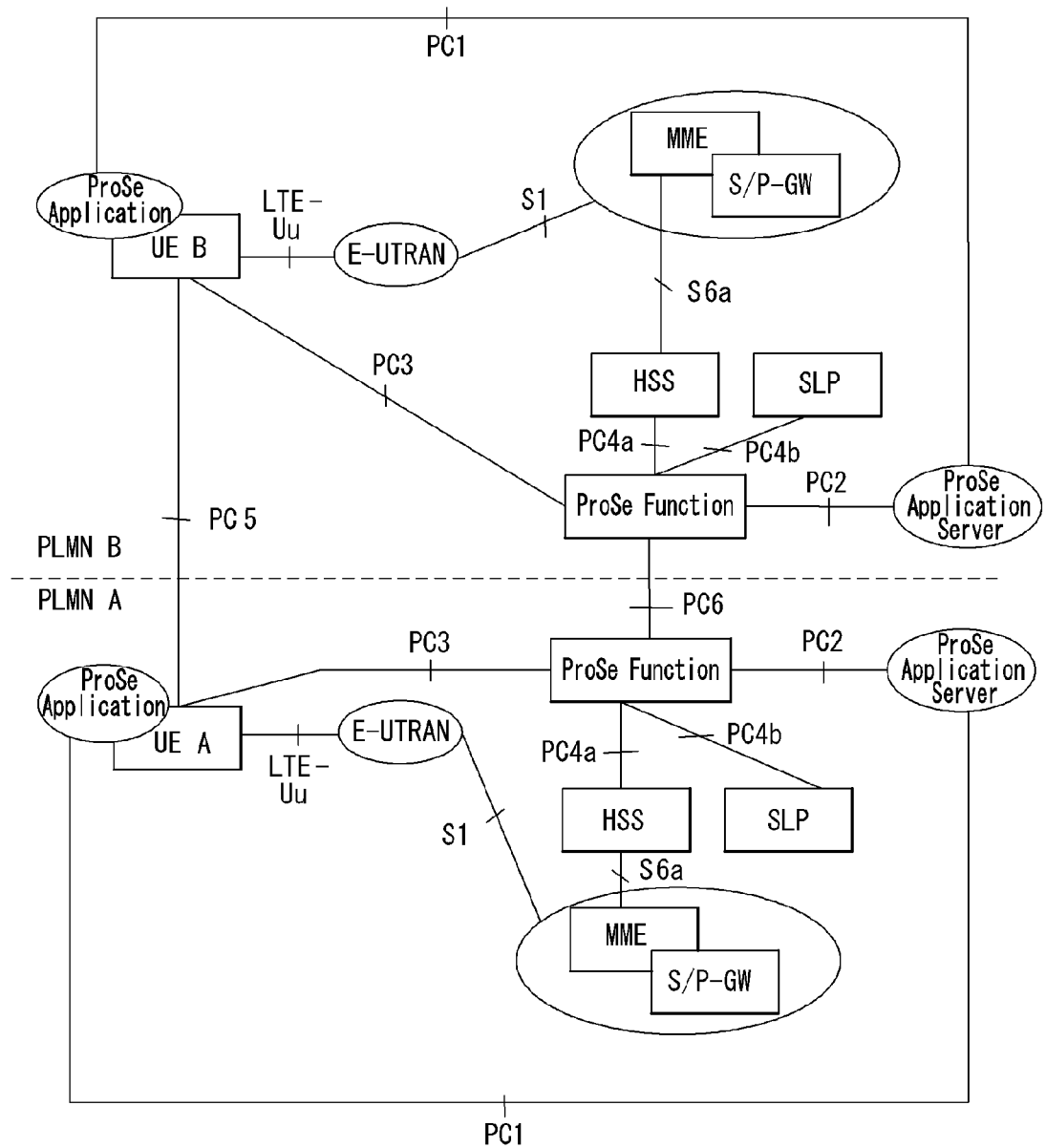

[FIG. 8]
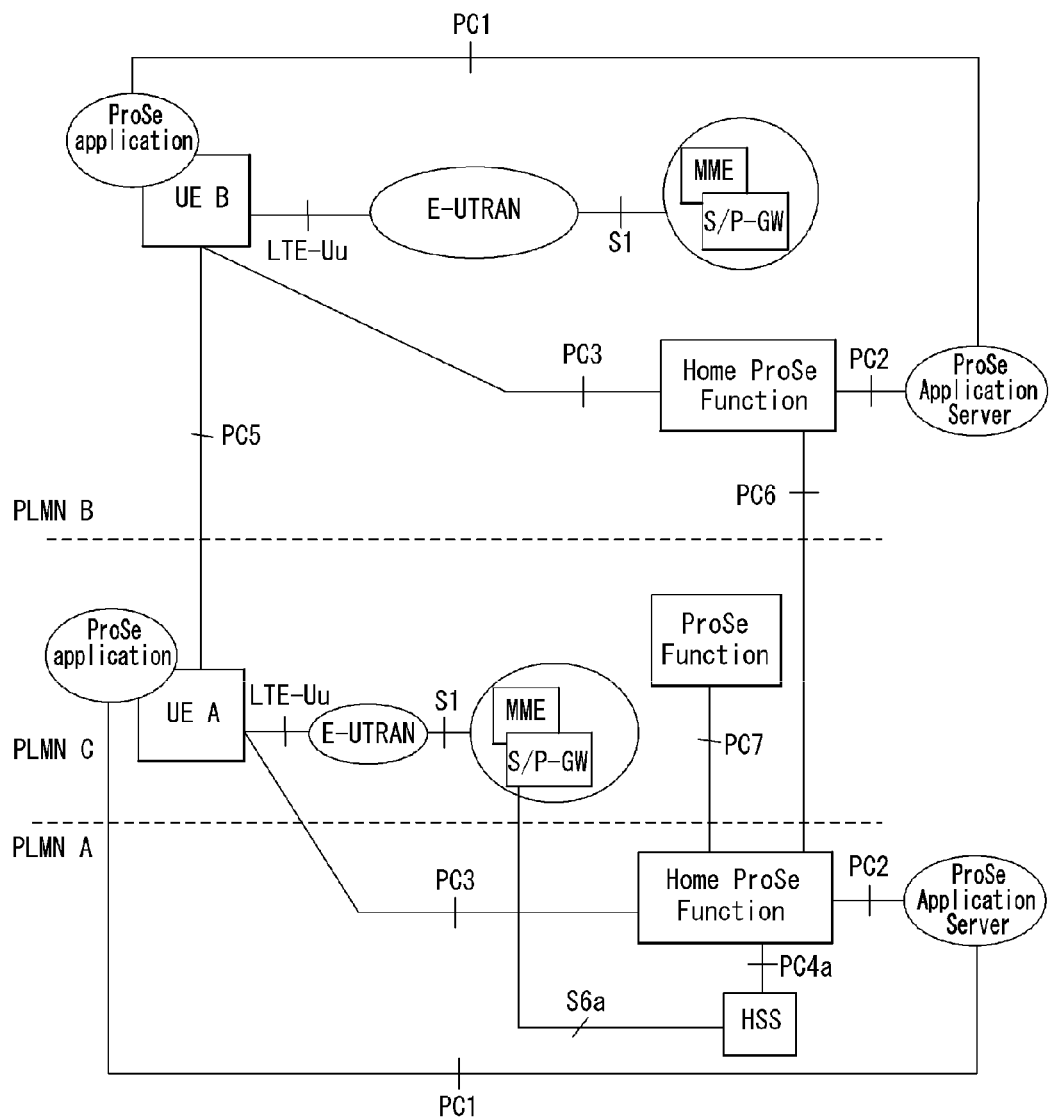

[FIG. 9]
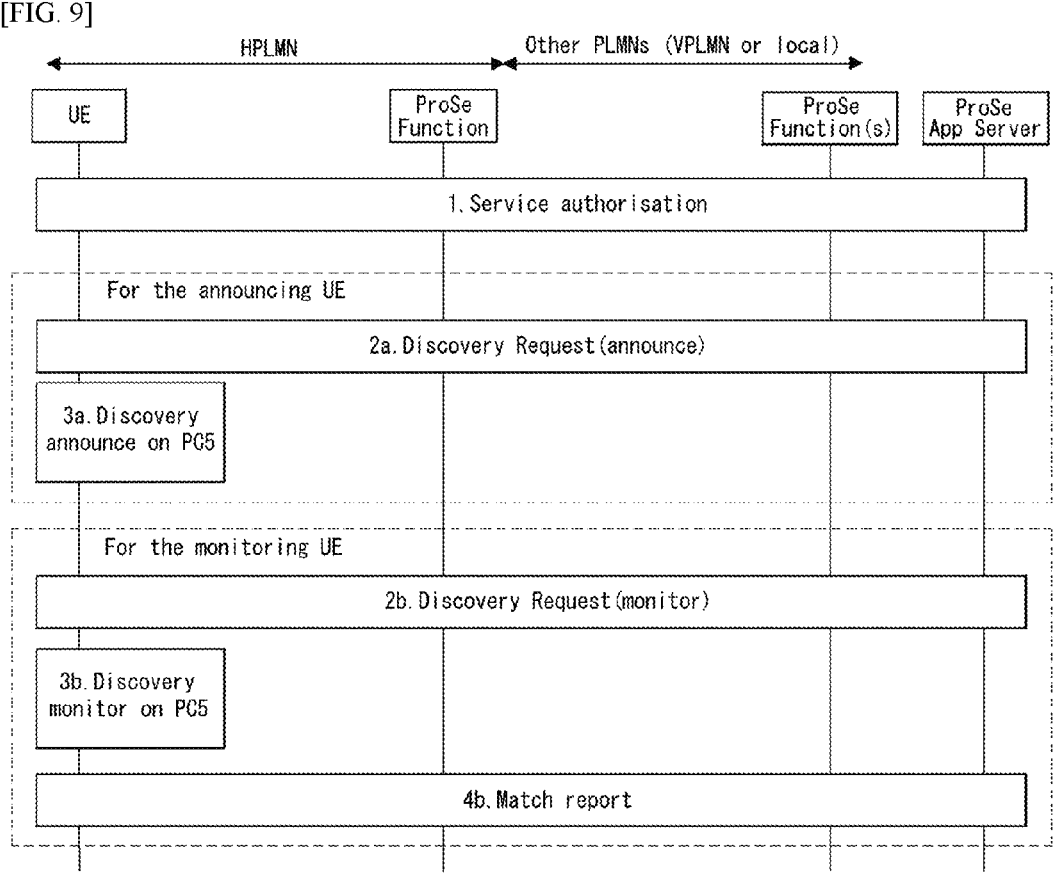

[FIG. 10]
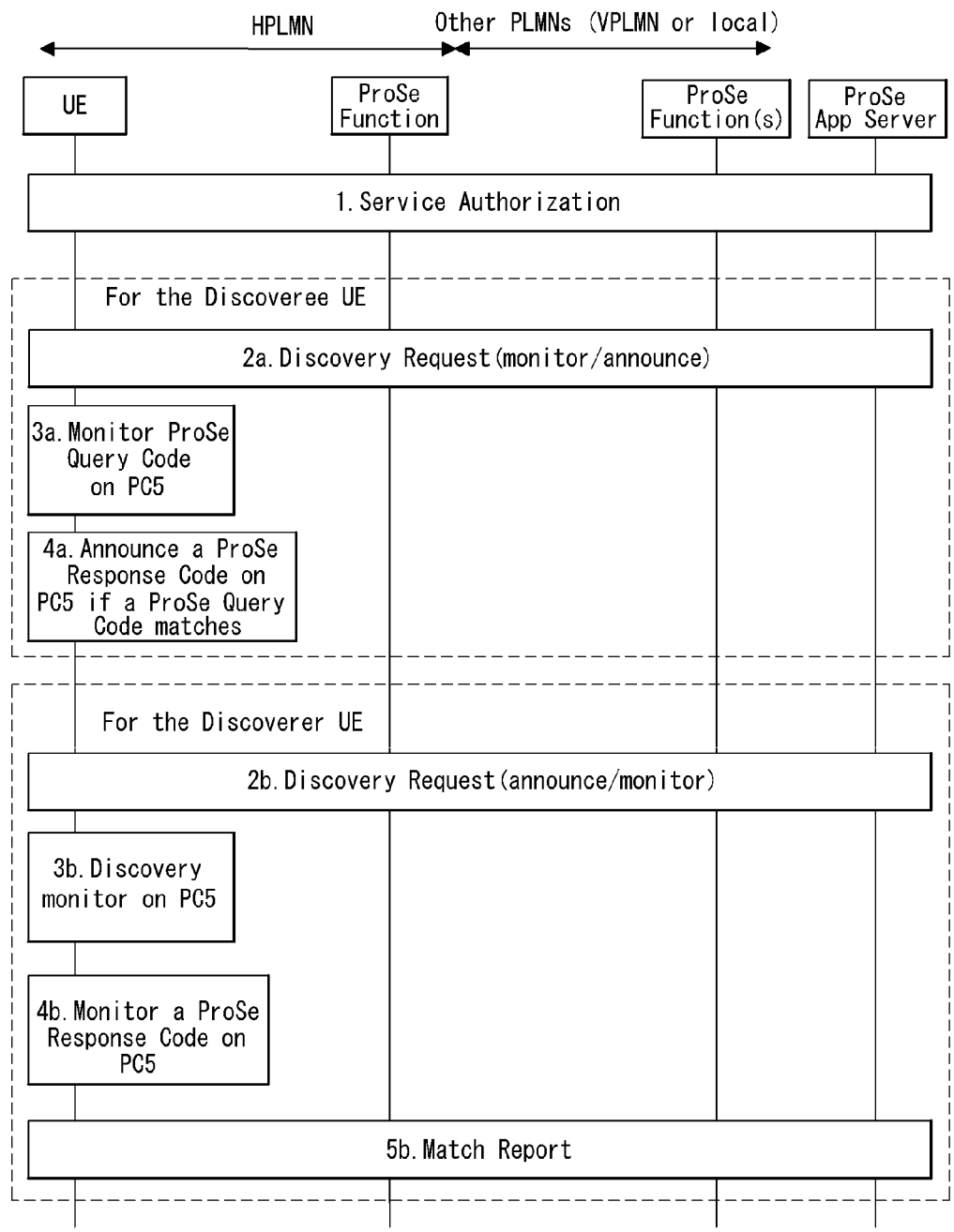

[FIG. 11]
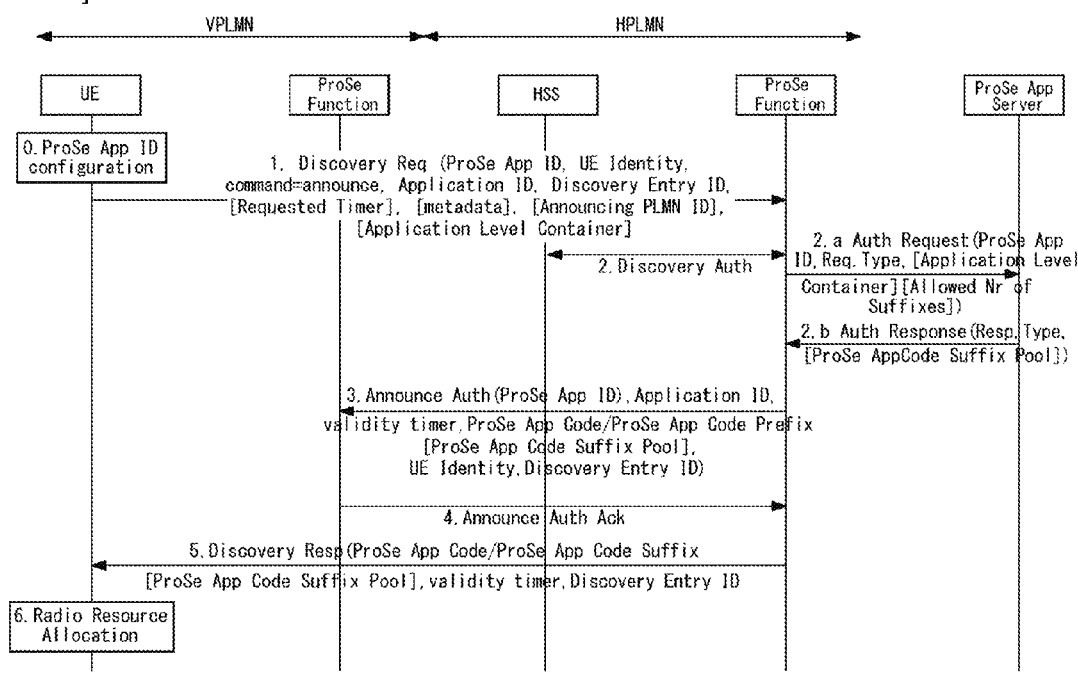

[FIG. 12]
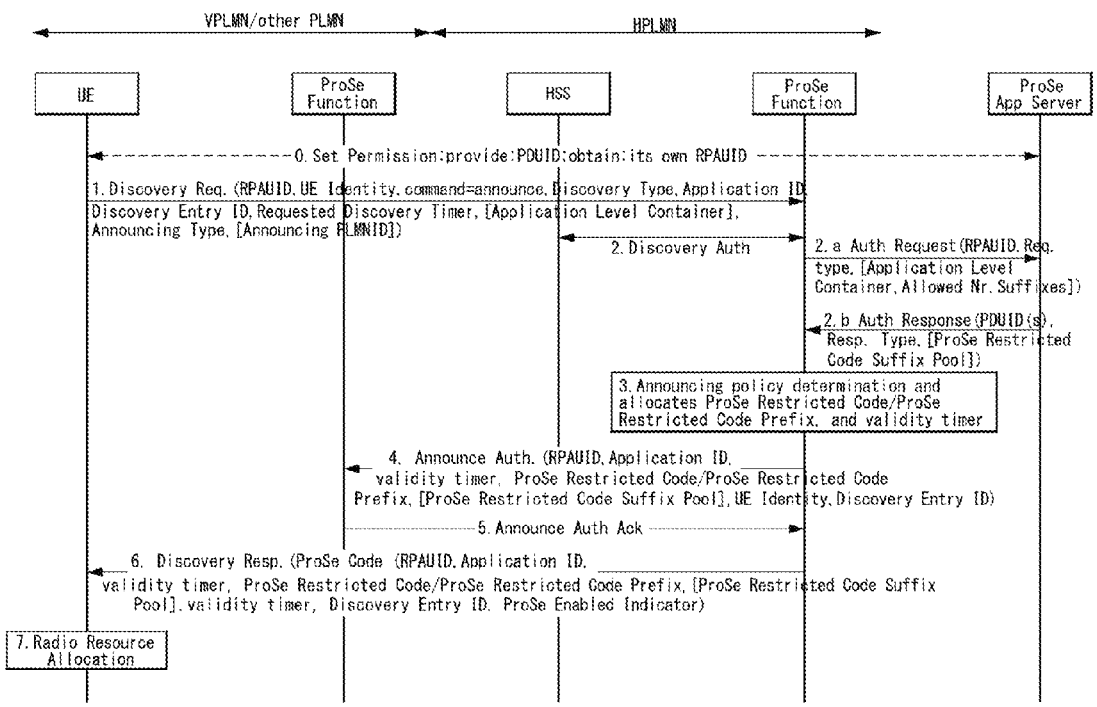

[FIG. 13]
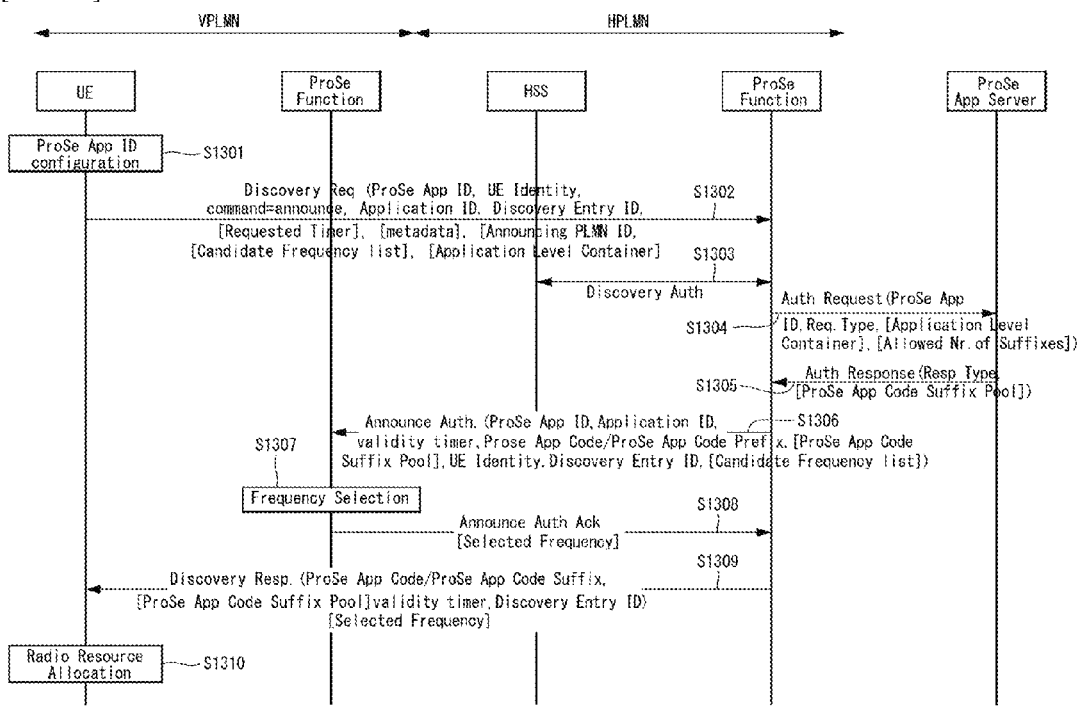

[FIG. 14]
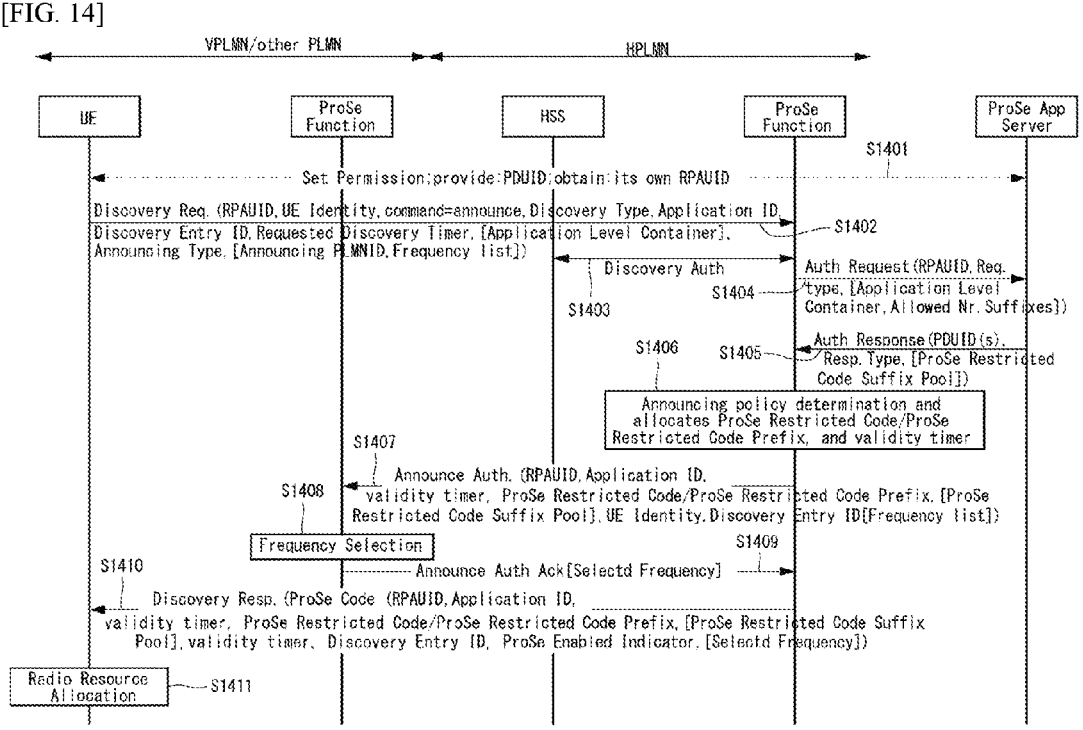

[FIG. 15]
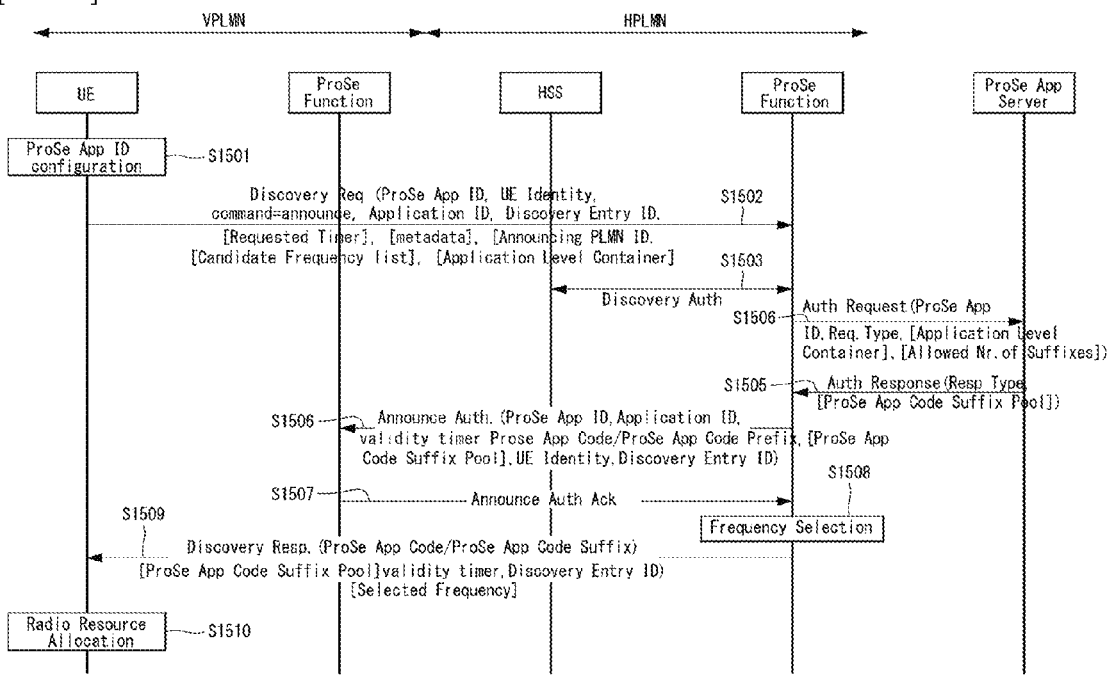

[FIG. 16]
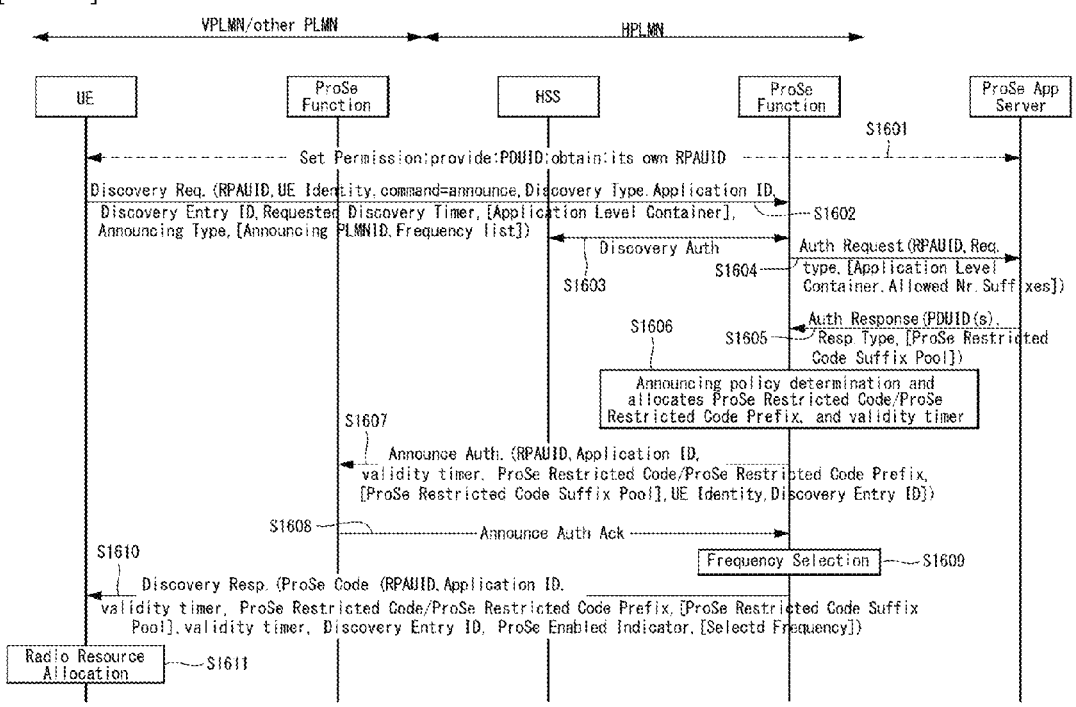

[FIG. 17]
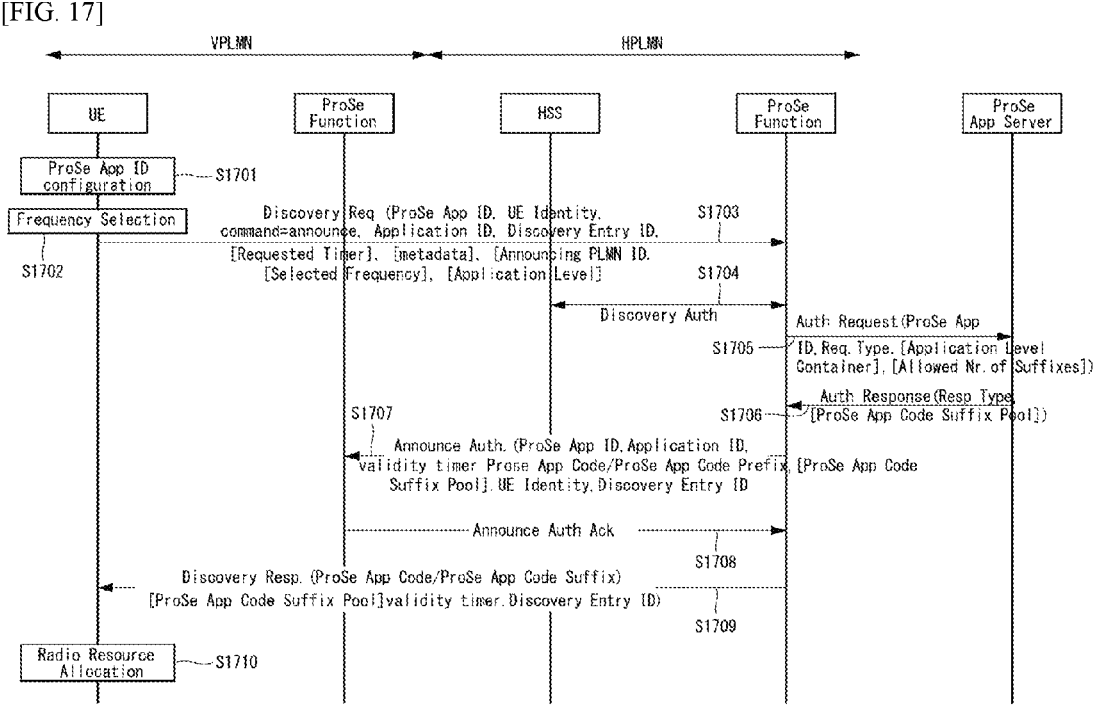

[FIG. 18]
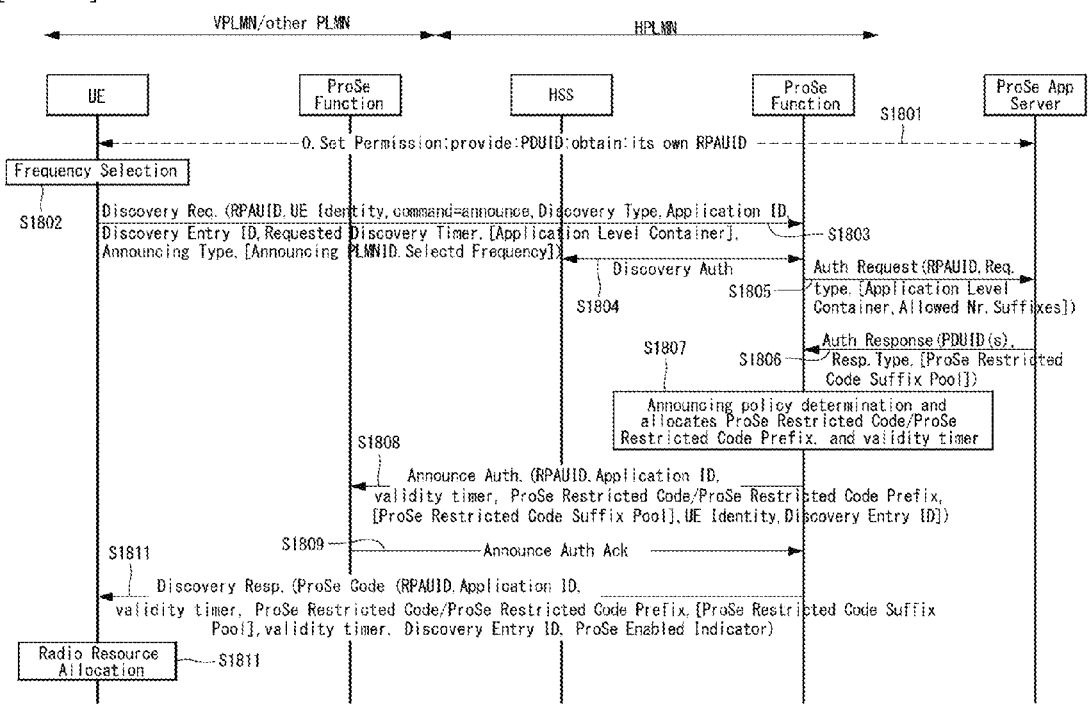

[FIG. 19]
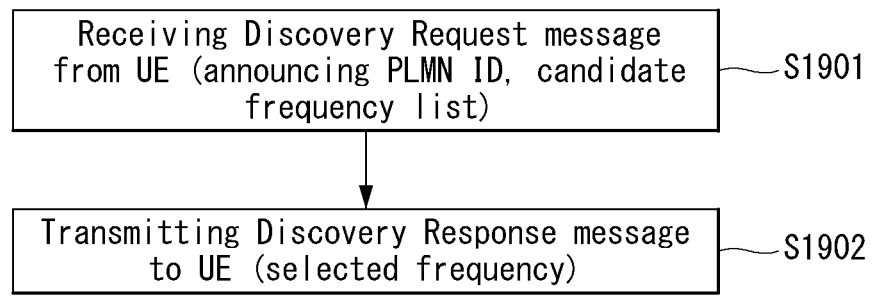

[FIG. 20]
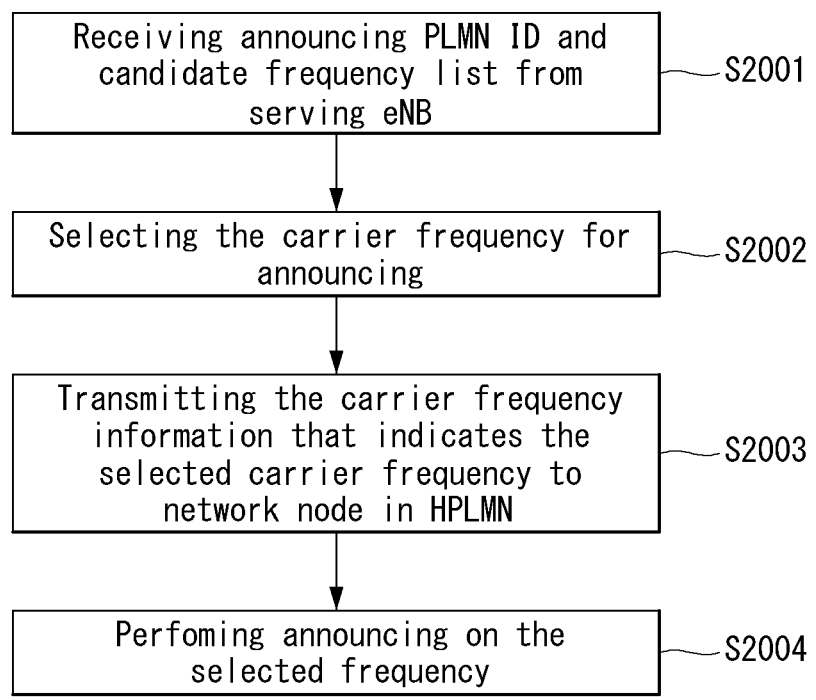

[FIG. 21]
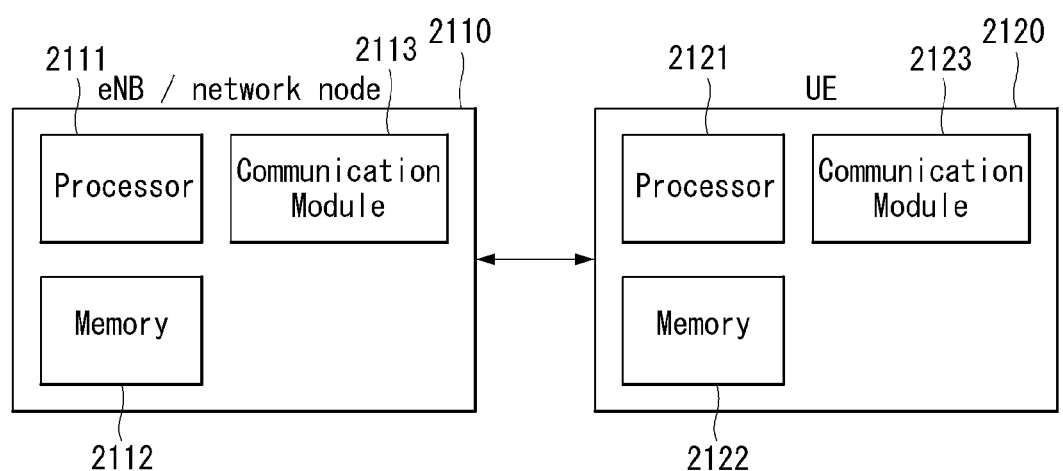

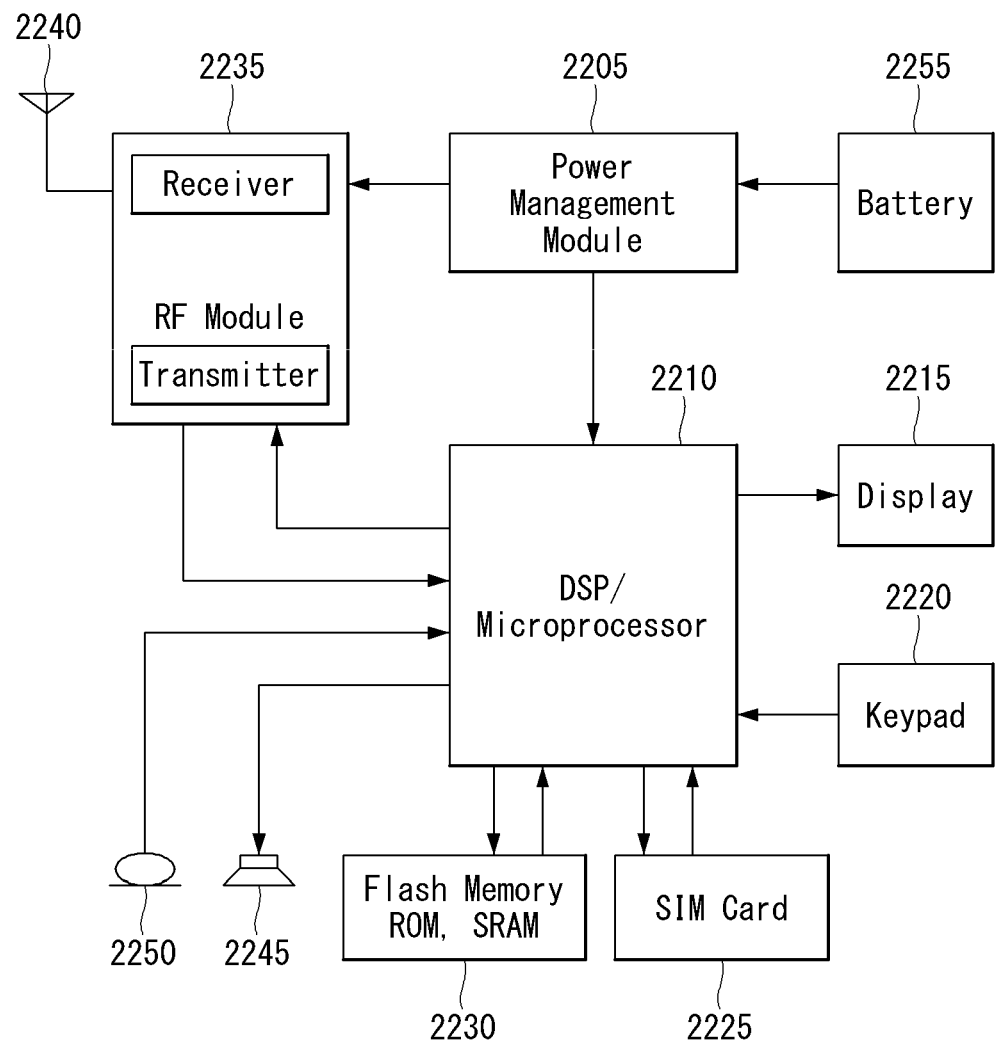
[FIG. 22]

METHOD AND DEVICE FOR DISCOVERY OPERATION OF UE IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No. 62/276,175, filed on Jan. 7, 2016, the contents of which are hereby incorporated by reference herein in its entirety.

BACKGROUND OF THE INVENTION

Field of the Invention

The present invention relates to a wireless communication system, and more particularly, to a method and device for supporting/performing a discovery operation of an UE in a wireless communication system that supports communication between UEs.

Discussion of the Related Art

A mobile communication system has been developed to provide a voice service while guaranteeing user mobility. However, the mobile communication system has been extended to a service range to a data service as well as a voice service, and nowadays, a resource shortage phenomenon occurs due to explosive traffic increase and users request a higher speed service and thus a more enhanced mobile communication system is required.

A next generation mobile communication system should be able to support acceptance of explosive data traffic, epochal increase of a transmission rate per user, acceptance of the largely increased connection devices number, very low end-to-end latency, and high energy efficiency. For this reason, various technologies such as dual connectivity, Massive Multiple Input Multiple Output (Massive MIMO), In-band Full Duplex, Non-Orthogonal Multiple Access (NOMA), super wideband support, and device networking have been researched.

SUMMARY OF THE INVENTION

The present invention provides a method of supporting/performing a discovery operation of an UE in a wireless communication system that supports communication between UEs.

The present invention further provides a method of selecting a frequency for inter-Public Land Mobile Network (PLMN) sidelink discovery transmission in a wireless communication system.

The technical problems of the present invention are not limited to the above-described technical problems and the other technical problems will be understood by those skilled in the art from the following description.

In accordance with an aspect of the present invention, a method in which a network node supports a discovery operation of a User Equipment (UE) in a wireless communication system includes: receiving, by a network node within a Home Public Land Mobile Network (HPLMN) of the UE, a Discovery Request message from the UE, wherein the Discovery Request message includes a candidate frequency list including an available plurality of carrier frequencies for announcing by the UE and an announcing PLMN ID including a PLMN Identifier (ID) of each of the carrier frequencies included in the candidate frequency list; and transmitting, by the network node within the HPLMN, a Discovery Response message to the UE, wherein the Discovery Response message includes carrier frequency information that indicates a carrier frequency selected for announcing by the UE among carrier frequencies included in the candidate frequency list.

Preferably, the carrier frequency for announcing by the UE may be selected by the network node within the HPLMN, when a PLMN ID within the announcing PLMN ID corresponds to the HPLMN.

Preferably, the carrier frequency for announcing by the UE may be selected based on at least one of a random selection method, a load-balancing based selection method, an operator configuration, a ProSe application type, or subscription information of the UE.

Preferably, the method may further include: transmitting an Announce Authorization message including the announcing PLMN ID and the candidate frequency list to a network node within the PLMN corresponding to the PLMN ID, when a PLMN ID within the announcing PLMN ID does not correspond to the HPLMN; and receiving an Announce Authorization Acknowledgement message including carrier frequency information selected for announcing by the UE from the network node within the PLMN corresponding to the PLMN ID.

Preferably, the carrier frequency for announcing by the UE by the network node within the PLMN corresponding to the PLMN ID may be selected based on at least one of a random selection method, a load-balancing based selection method, an operator configuration, a ProSe application type, or subscription information of the UE.

Preferably, the carrier frequency for announcing by the UE may be selected based on at least one of subscription information of the UE, a ProSe Application type, or a HPLMN Operator configuration.

Preferably, the method may further include receiving information necessary for frequency selection from the network node within the PLMN corresponding to the PLMN ID, wherein the carrier frequency for announcing by the UE may be selected based on information necessary for frequency selection.

Preferably, the information necessary for frequency selection may include at least one of a Random Selection parameter, a mapping table of an Application and an available frequency, application information that cannot be used on each frequency basis, and periodic load information of a specific frequency.

Preferably, the information necessary for frequency selection may include at least one of a Frequency usage status and rate report of a Serving eNodeB servicing in a carrier frequency included in the candidate frequency list, the number of UE served by the Serving eNodeB, and frequency preference for announcing of the UE of an Operator.

Preferably, as the carrier frequency for announcing by the UE, one or a plurality of frequencies may be selected per PLMN.

Preferably, a ProSe Application Code used for identifying announcing by the UE may be differently allocated or commonly allocated on each frequency basis of the plurality of frequencies, when as the carrier frequency for announcing by the UE, a plurality of frequencies are selected per PLMN.

Preferably, announcing may be performed to search for neighboring another UE by the UE on a carrier frequency indicated by the carrier frequency information.

In accordance with another aspect of the present invention, a method in which a User Equipment (UE) performs discovery in a wireless communication system includes: receiving a candidate frequency list including an available plurality of carrier frequencies for announcing from a serving eNodeB and an announcing PLMN ID including a PLMN Identifier (ID) of each of the carrier frequencies included in the candidate frequency list; selecting a carrier frequency for announcing among carrier frequencies included in the candidate frequency list; transmitting carrier frequency information that indicates the selected carrier frequency to a network node within a Home Public Land Mobile Network (HPLMN) of the UE; and performing announcing in order to search for neighboring another UE on the selected carrier frequency.

Preferably, the carrier frequency for announcing may be selected based on at least one of a random selection method, a load-balancing based selection method, an operator configuration, a ProSe application type, or subscription information of the UE.

Preferably, as the carrier frequency for announcing, one or a plurality of frequencies may be selected per PLMN.

Preferably, a ProSe Application Code used for identifying announcing may be differently allocated or commonly allocated on each frequency basis of the plurality of frequencies, when as the carrier frequency for announcing, a plurality of frequencies are selected per PLMN.

Advantageous Effects

According to an exemplary embodiment of the present invention, in a wireless communication system that supports communication between UEs, a discovery operation in which the UE searches for adjacent another UE can be smoothly performed.

According to an exemplary embodiment of the present invention, when performing an inter-PLMN sidelink discovery transmission operation, a frequency is clearly selected/determined and thus even if there are a plurality of available carrier frequencies, operation can be prevented from being ambiguous.

The effect of the present invention is not limited to the above-described effects and the other objects will be understood by those skilled in the art from the following description.

BRIEF DESCRIPTION OF THE DRAWINGS

For understanding of the present invention, the attached drawings included as a portion of a detailed description provide an exemplary embodiment of the present invention and describe a technical characteristic of the present invention together with a detailed description.

FIG. 1 illustrates an Evolved Packet System (EPS) to which the present invention can be applied.

FIG. 2 illustrates an example of a structure of an evolved universal terrestrial radio access network (E-UTRAN) to which the present invention can be applied.

FIG. 3 illustrates a structure of an E-UTRAN and an EPC in a wireless communication system to which the present invention can be applied.

FIG. 4 illustrates a radio interface protocol structure between a UE and an E-UTRAN in a wireless communication system to which the present invention can be applied.

FIG. 5 illustrates a structure of a physical channel in a wireless communication system to which the present invention can be applied.

FIG. 6 illustrates a contention-based random access procedure in a wireless communication system to which the present invention can be applied.

FIGS. 7 and 8 illustrate ProSe architecture model in a wireless communication system to which the present invention can be applied.

FIG. 9 illustrates a procedure for ProSe Direct Discovery (Model A) in a wireless communication system to which the present invention can be applied.

FIG. 10 illustrates a procedure for ProSe Direct Discovery (Model B) in a wireless communication system to which the present invention can be applied.

FIG. 11 illustrates an Announce request procedure (roaming/inter-PLMN transmission) in a wireless communication system to which the present invention can be applied.

FIG. 12 illustrates an Announce request procedure (roaming/inter-PLMN transmission) in a wireless communication system to which the present invention can be applied.

FIGS. 13 to 18 illustrate an announcing request procedure for a UE discovery operation according to an exemplary embodiment of the present invention.

FIG. 19 illustrates a method of supporting a discovery operation of an UE according to an exemplary embodiment of the present invention.

FIG. 20 illustrates a method in which an UE performs discovery according to an exemplary embodiment of the present invention.

FIGS. 21 and 22 illustrate a configuration of a communication device according to an exemplary embodiment of the present invention.

DETAILED DESCRIPTION OF THE EMBODIMENTS

Hereinafter, an exemplary embodiment of the present invention will be described in detail with reference to the attached drawings. A detailed description of the present invention to be described hereinafter together with the attached drawings describes an exemplary embodiment of the present invention and does not represent a sole embodiment in which the present invention may be executed. The following detailed description includes detailed contents in order to provide complete understanding of the present invention. However, a person of ordinary skill in the art knows that the present invention may be executed without such detailed contents.

In several cases, in order to avoid a concept of the present invention from being ambiguous, well-known structures and devices may be omitted or a core function of each structure and device may be mainly shown in a block diagram form.

In this specification, a base station has a meaning as a terminal node of a network that directly communicates with a terminal. In this document, a specific operation described as performed by a base station may be performed by an upper node of the base station in some case. That is, in a network configured with a plurality of network nodes including the base station, it will become apparent that various operations performed for communication with the terminal may be performed by a base station or other network nodes other than the base station. A Base Station (BS) may be replaced with a term such as a fixed station, a Node B, an evolved-NodeB (eNB), a base transceiver system (BTS), and an Access Point (AP). Further, the 'terminal' may be fixed or may have mobility and may be replaced with a term such as a User Equipment (UE), a Mobile Station (MS), a User terminal (UT), a Mobile Subscriber Station (MSS), a Subscriber Station (SS), an Advanced Mobile Station (AMS), a Wireless terminal (WT), a Machine-Type Communication (MTC) device, a Machine-to-Machine (M2M) device, and a Device-to-Device (D2D) device.

Hereinafter, a downlink (DL) means communication from the BS to the terminal, and an uplink (UL) means communication from the terminal to the base station. In the downlink, a transmitter may be a portion of the base station, and the receiver may be a portion of the terminal. In the uplink, the transmitter may be a portion of the terminal, and the receiver may be a portion of the base station.

Specific terms used in the following description are provided for understanding of the present invention, and use of such a specific term may be changed in other forms without deviating from the spirit and scope of the present invention.

The following technology may be used for various wireless access systems such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). The CDMA may be implemented with radio technology such as universal terrestrial radio access (UTRA) or CDMA2000. The TDMA may be implemented with radio technology such as global system for mobile communications (GSM)/general packet radio service (GPRS)/enhanced data rates for GSM evolution (EDGE). The OFDMA may be implemented with radio technology such as IEEE 802.11 (Wi-Fi), IEEE 802.16 (WiMAX), IEEE 802-20, and E-UTRA (evolved UTRA). The UTRA is a portion of a universal mobile telecommunications system (UMTS). 3rd generation partnership project (3GPP) long term evolution (LTE) is a portion of an evolved UMTS (E-UMTS) using E-UTRA and adapts OFDMA in a downlink and adapts SC-FDMA in an uplink. LTE-advanced (A) is innovation of 3GPP LTE.

Exemplary embodiments of the present invention may be supported by standard documents that describe at least one of IEEE 802, 3GPP, and 3GPP2, which are wireless access systems. That is, in exemplary embodiments of the present invention, steps or portions that are not described to clearly expose the spirit and scope of the present invention may be supported by the documents. Further, entire terms of this document may be described by the standard document.

For clear description, 3GPP LTE/LTE-A is mainly described, but a technical characteristic of the present invention is not limited thereto.

Terms that may be used in this document are defined as follows.

Universal Mobile Telecommunications System (UMTS): 3-Generation mobile communication technology based on Global System for Mobile Communication (GSM) and developed by 3GPP, Evolved Packet System (EPS): A network system configured with an Evolved Packet Core (EPC), which is a packet switched core network based on an Internet Protocol (IP) and an access network such as LTE and UTRAN. The EPS is a network of a form in which the UMTS is innovated.

NodeB: Base station of an UMTS network. The NodeB is installed outdoor and covers a macro cell.

eNodeB: Base station of an EPS network. The eNodeB is installed outdoor and covers a macro cell.

UE: User device. The UE may be referred to as a term such as a terminal, a Mobile Equipment (ME), and a Mobile Station (MS). Further, the UE may be a device that can carry such as a notebook computer, a mobile phone, a Personal Digital Assistant (PDA), a smart phone, and a multimedia device or may be a device that cannot carry such as a Personal Computer (PC) and a vehicle mounting device. In MTC related contents, the UE may indicate an MTC terminal.

IP Multimedia Subsystem (IMS): Subsystem that provides a multimedia service based on IP.

International Mobile Subscriber Identity (IMSI): Internationally uniquely allocated user identifier in a mobile communication network.

Machine Type Communication (MTC): Communication performed by a machine without intervention of a person. The MTC may be referred to as Machine to Machine (M2M) communication.

MTC terminal (MTC UE or MTC device): A terminal (e.g., vending machine, meter) that has a communication (e.g., communication with an MTC server through the PLMN) function through a mobile communication network and that performs a MTC function.

MTC server: A server on a network that manages the MTC terminal. The MTC server may exist at the inside or the outside of a mobile communication network. The MTC server may have an interface in which an MTC user may access. Further, the MTC server may provide an MTC related service to other servers and may have Services Capability Server (SCS) form and may be an MTC application server.

(MTC) application: A service (e.g., remote meter reading, quantity movement track, weather observation sensor) to which (the MTC is applied).

(MTC) application server: A server on a network in which an (MTC) application is executed.

MTC feature: A function of a network for supporting an MTC application. For example, MTC monitoring is a feature for preparing equipment loss in an MTC application of remote meter reading, and lower mobility is a feature for an MTC application of a MTC terminal such as a vending machine.

MTC user: The MTC user uses a service provided by the MTC server.

MTC subscriber: The MTC subscriber has an access relation with a network operator and is an entity that provides a service to at least one MTC terminal.

MTC group: The MTC group shares at least one MTC feature and means a group of MTC terminals that belong to an MTC subscriber.

Services Capability Server (SCS): An entity for communicating with MTC InterWorking Function (MTC-IWF) on a Home PLMN (HPLMN) and an MTC terminal and is accessed to a 3GPP network. The SCS provides a capability for use by at least one MTC application.

External Identifier: An identifier in which an external entity (e.g., SCS or application server) of a 3GPP network uses for indicating (or identifying) an MTC terminal (or a subscriber to which the MTC terminal belongs) and is globally unique. The external identifier is configured with a domain identifier and a local identifier as follows.

Domain Identifier: An identifier for identifying a domain under the control of a mobile communication network provider. One provider may use a domain identifier on a service basis in order to provide access to other services.

Local Identifier: An identifier used in estimating or acquiring an International Mobile Subscriber Identity (IMSI). The local identifier should uniquely exist within an application domain and is managed by a mobile communication network provider.

Radio Access Network (RAN): A unit including a Node B and a Radio Network Controller (RNC) that controls the Node B in a 3GPP network, and an eNodeB. The RAN exists at the terminal end and provides connection to a core network.

Home Location Register (HLR)/Home Subscriber Server (HSS): A database having subscriber information within a 3GPP network. The HSS may perform a function of configuration storage, identity management, and user state storage.

RAN Application Part (RANAP): An interface between nodes (i.e., Mobility Management Entity (MME)/Serving General Packet Radio Service (GPRS) Supporting Node (SGSN)/Mobile Switching Center (MSC)) that perform the control of a RAN and a core network.

Public Land Mobile Network (PLMN): A network configured as an object to provide a mobile communication service to individuals. The PLMN may be divided and configured on an operator basis.

Non-Access Stratum (NAS): A functional layer for transmitting and receiving a traffic message and signaling between a terminal and a core network at UMTS and EPS protocol stacks. The NAS has a main function of supporting mobility of the terminal and supporting a session management procedure that establishes and maintains IP connection between the terminal and a PDN GW.

Service Capability Exposure Function (SCEF): An entity within a 3GPP architecture for service capability exposure that provides a means for safely exposing a service and a capability provided by an 3GPP network interface.

Hereinafter, the present invention will be described based on the defined terms.

System to which the Present Invention can be Applied

FIG. 1 illustrates an Evolved Packet System (EPS) to which the present invention can be applied.

A network structure diagram of FIG. 1 simply illustrates a structure of an EPS including an Evolved Packet Core (EPC).

An EPC is a core element of System Architecture Evolution (SAE) for enhancing a performance of 3GPP technologies. The SAE corresponds to a research subject that determines a network structure that supports mobility between various kinds of networks. The SAE has a target that provides an optimized packet-based system that supports various wireless access technologies based on, for example, an IP and that provides a more enhanced data transmission ability.

Specifically, the EPC is a core network of an IP mobile communication system for a 3GPP LTE system and may support a packet-based real time and non-real time service. In an existing mobile communication system (i.e., second generation or third generation mobile communication system), a function of a core network was implemented through two distinguished sub-domains of Circuit-Switched (CS) for voice and Packet-Switched (PS) for data. However, in an innovated 3GPP LTE system of the third generation mobile communication system, sub-domains of CS and PS were unified into a single IP domain. That is, in the 3GPP LTE system, connection between terminals having an IP capability may be formed through an IP-based base station (e.g., evolved Node B (eNodeB)), an EPC, an application domain (e.g., IMS). That is, the EPC is an essential structure in implementing an end-to-end IP service.

The EPC may include various constituent elements, and FIG. 1 illustrates a Serving Gateway (SGW) (or S-GW), a Packet Data Network Gateway (PDN GW) (or PGW or P-GW), a Mobility Management Entity (MME), a Serving General Packet Radio Service (GPRS) Supporting Node (SGSN), and an enhanced Packet Data Gateway (ePDG) corresponding to a portion of the various constituent elements.

The SGW operates as a boundary point between a radio access network (RAN) and a core network and is an element that performs a function of maintaining a data path between the eNodeB and the PDN GW. Further, when the terminal moves over an area served by the eNodeB, the SGW performs a function of a local mobility anchor point. That is, for mobility within a Universal Mobile Telecommunications System (Evolved-UMTS) Terrestrial Radio Access Network defined after 3GPP release-8) (E-UTRAN), packets may be routed through the SGW. Further, the SGW may function as an anchor point for mobility with another 3GPP network (RAN defined before 3GPP release-8, for example, UTRAN or Global System for Mobile Communication (GSM)/Enhanced Data rates for Global Evolution (EDGE) Radio Access Network (GERAN)).

The PDN GW corresponds to a termination point of a data interface toward a packet data network. The PDN GW may support policy enforcement features, packet filtering, and charging support. Further, the PDN GW may perform an anchor point function for mobility management with an unreliable network such as a 3GPP network and a non-3GPP network (e.g., an Interworking Wireless Local Area Network (I-WLAN), a Code Division Multiple Access (CDMA) network or a reliable network such as a Wimax).

In an illustration of a network structure of FIG. 1, the SGW and the PDN GW are configured as a separate gateway, but two gateways may be implemented according to a single gateway configuration option.

The MME is an element that performs signaling and control functions for supporting access to network connection of the terminal, allocation of a network resource, tracking, paging, roaming, and handover. The MME controls control plane functions related to a subscriber and session management. The MME manages many eNodeBs and performs signaling for selection of a conventional gateway for handover of another 2G/3G network. Further, the MME performs a function of security procedures, terminal-to-network Session Handling, and idle terminal location management.

The SGSN handles entire packet data such as user mobility management and authentication of another 3GPP network (e.g., GPRS network).

The ePDG functions as a security node of an unreliable non-3GPP network (e.g., I-WLAN, WiFi hotspot).

Referring to FIG. 1, the UE having an IP capability may access to an IP service network (e.g., IMS) in which a provider (i.e., operator) provides via various elements within the EPC based on 3GPP access and non-3GPP access.

Further, FIG. 1 illustrates various reference points (e.g., S1-U, S1-MME). In the 3GPP system, a concept link that connects two functions existing at different functional entities of an E-UTRAN and an EPC is defined to a reference point. Table 1 represents a reference point of FIG. 1. In addition to an illustration of Table 1, various reference points may exist according to a network structure.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to the UE mobility and if the Serving GW needs to connect to a non-collocated PDN GW for the required PDN connectivity. |
| S11 | Reference point of the control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among reference points of FIG. 1, S2a and S2b correspond to a non-3GPP interface. S2a is a reference point that provides related control and mobility resource between a reliable non-3GPP access and PDN GW to a user plane. S2b is a reference point that provides related control and mobility support between ePDG and PDN GW to a user plane.

FIG. 2 illustrates an example of a network structure of an evolved universal terrestrial radio access network (E-UTRAN) to which the present invention can be applied.

The E-UTRAN system is an innovated system of an existing UTRAN system and may be, for example, a 3GPP LTE/LTE-A system. The communication network is widely disposed to provide various communication services such as a voice (e.g., Voice over Internet Protocol (VoIP)) through IMS and packet data.

Referring to FIG. 2, the E-UMTS network includes an E-UTRAN, an EPC, and at least one UE. The E-UTRAN is configured with eNBs that provide control plane and user plane protocols to the UE, and the eNBs are connected through an X2 interface.

An X2 user plane interface (X2-U) is defined between the eNBs. The X2-U interface provides non-guaranteed delivery of a user plane packet data unit (PDU). An X2 control plane interface (X2-CP) is defined between two neighboring eNBs. The X2-CP performs a function of context transfer between the eNBs, the control of a user plane tunnel between a source eNB and a target eNB, transfer of a handover related message, and uplink load management.

The eNB is connected to the UE through a wireless interface and is connected to an Evolved Packet Core (EPC) through an S1 interface.

An S1 user plane interface (S1-U) is defined between the eNB and a serving gateway (S-GW). An S1 control plane interface (S1-MME) is defined between the eNB and a mobility management entity (MME). The S1 interface performs an Evolved Packet System (EPS) bearer service management function, a non-access stratum (NAS) signaling transport function, network sharing, and a MME load balancing function. The S1 interface supports many-to-many-relation between the eNB and the MME/S-GW.

The MME may perform various functions of NAS signaling security, Access Stratum (AS) security control, Core Network (CN) Inter-CN signaling for supporting mobility between 3GPP access networks, IDLE mode UE reachability (including execution and control of paging retransmission), Tracking Area Identity (TAI) management (for idle and active mode terminal), PDN GW and SGW selection, MME selection for handover in which the MME is changed, SGSN selection for handover to a 2G or 3G 3GPP access network, roaming, authentication, a bearer management function including dedicated bearer establishment, and Public Warning System (PWS) (including an Earthquake and Tsunami Warning System (ETWS) and Commercial Mobile Alert System (CMAS)) message transmission support.

FIG. 3 illustrates a structure of an E-UTRAN and an EPC in a wireless communication system to which the present invention can be applied.

Referring to FIG. 3, the eNB may perform a function of selection of a gateway (e.g., MME), routing to a gateway for radio resource control (RRC) activation, scheduling and transmission of a broadcast channel (BCH), dynamic resource allocation to the UE in an uplink and a downlink, and mobility control connection in an LTE_ACTIVE state. As described above, a gateway within the EPC may perform a function of origination, LTE_IDLE state management, ciphering of a user plane, a System Architecture Evolution (SAE) bearer control, and ciphering and integrity protection of NAS signaling.

FIG. 4 illustrates a radio interface protocol structure between an UE and an E-UTRAN in a wireless communication system to which the present invention can be applied. FIG. 4A illustrates a wireless protocol structure of a control plane, and FIG. 4B illustrates a wireless protocol structure of a user plane.

Referring to FIG. 4, layers of a wireless interface protocol between the UE and the E-UTRAN may be divided into a first layer L1, a second layer L2, and a third layer L3 based on subordinate 3 layers of an open system interconnection (OSI) standard model widely known in the art of a communication system. The wireless interface protocol between the UE and the E-UTRAN is horizontally formed with a physical layer, a data link layer, and a network layer and is vertically divided into a protocol stack user plane for transmitting data information and a control plane, which is a protocol stack for transferring signaling.

The control plane is a transmitting path of control messages in which the UE and the network use to manage a call. The user plane means a path that transmits data, for example, voice data or Internet packet data generated in an application layer. Hereinafter, each layer of a control plane and a user plane of a wireless protocol will be described.

By using a physical channel, a physical layer (PHY), which is a first layer L1 provides an information transfer service to a superordinate layer. The physical layer is connected to a medium access control (MAC) layer located at a superordinate level through a transport channel, and data are transmitted between the MAC layer and the physical layer through the transport channel. The transport channels are classified according to a method and feature in which data are transmitted through a wireless interface. Data are transmitted between different physical layers and between a physical layer of a transmitting terminal and a physical layer of a receiving terminal through the physical channel. The physical layer is modulated with an orthogonal frequency division multiplexing (OFDM) method and uses a time and a frequency as a radio resource.

There are several physical control channels used in a physical layer. The physical downlink control channel (PDCCH) notifies the UE of resource allocation of a paging channel (PCH) and a downlink shared channel (DL-SCH) and hybrid automatic repeat request (HARQ) information related to an uplink shared channel (UL-SCH). Further, the PDCCH may transmit UL grant that notifies resource allocation of uplink transmission to the UE. A physical control format indicator channel (PDFICH) notifies the UE of the number of OFDM symbols using for PDCCHs and is transmitted to every subframe. A physical HARQ indicator channel (PHICH) transmits a HARQ acknowledge (ACK)/non-acknowledge (NACK) signal in response to uplink transmission. A physical uplink control channel (PUCCH) transmits uplink control information such as HARQ ACK/NACK, a scheduling request, and a channel quality indicator (CQI) of downlink transmission. The physical uplink shared channel (PUSCH) transmits an UL-SCH.

A MAC layer of the second layer L2 provides a service to a radio link control (RLC) layer, which is a superordinate layer through a logical channel. Further, the MAC layer includes a mapping function between the logical channel and the transport channel and a multiplexing/demultiplexing function to a transport block provided to a physical channel on a transport channel of a MAC service data unit (SDU) that belongs to the logical channel.

An RLC layer of the second layer L2 supports reliable data transmission. A function of the RLC layer includes concatenation, segmentation, and reassembly of an RLC SDU. In order to guarantee various quality of services (QoS) in which a radio bearer (RB) requires, the RLC layer provides three operation modes of a transparent mode (TM), an unacknowledged mode (UM), and an acknowledge mode (AM). An AM RLC provides error correction through an automatic repeat request (ARQ). When the MAC layer performs an RLC function, the RLC layer may be included as a function block of an MAC layer.

A packet data convergence protocol (PDCP) layer of the second layer L2 performs a transfer function of user data in a user plane and a header compression and ciphering function. In order to efficiently transmit an Internet protocol (IP) packet such as Internet protocol version 4 (IPv4) or Internet protocol version 6 (IPv6) through a wireless interface having a small bandwidth, a header compression function means a function of reducing an IP packet header size having a relatively large size and that contains unnecessary control information. A function of a PDCP layer in the control plane includes transfer of control plane data and ciphering/integrity protection.

A radio resource control (RRC) layer located at a lowermost portion of a third layer L3 is defined to only a control plane. The RRC layer performs a function of controlling a radio resource between the UE and the network. For this reason, the UE and the network exchange an RRC message through the RRC layer. The RRC layer controls a logical channel, a transport channel, and a physical channel in relation to a configuration, a re-configuration, and release of radio bearers. For data transmission between the UE and the network, the radio bearer means a logical path provided by the second layer L2. A configuration of a radio bearer means prescription of a feature of a wireless protocol layer and a channel in order to provide a specific service and a configuration of each detailed parameter and operation method. The radio bearer may be again divided into two of signaling RB (SRB) and data RB (DRB). The SRB is used as a path that transmits an RRC message at the control plane, and the DRB is used as a path that transmits user data at the user plane.

A non-access stratum (NAS) layer located as a superordinate layer of the RRC layer performs a function of session management and mobility management.

One cell constituting a base station is set to one of bandwidths such as 1.25, 2.5, 5, 10, and 20 Mhz to provide a downlink or uplink transmission service to several UEs. Different cells may be set to provide different bandwidths.

A downlink transport channel that transmits data from the network to the UE includes a broadcast channel (BCH) that transmits system information, a PCH that transmits a paging message, and a DL-SCH that transmits user traffic or a control message. Traffic or a control message of downlink multicast or a broadcasting service may be transmitted through the DL-SCH or through a separate downlink multicast channel (MCH). An uplink transport channel that transmits data from the UE to the network includes a random access channel (RACH) that transmits an initial control message and an uplink shared channel (UL-SCH) that transmits user traffic or a control message.

The logical channel is a superordinate channel of the transport channel and is mapped to the transport channel. The logical channel may be divided into a control channel for transfer of control area information and a traffic channel for transfer of user area information. The control channel includes a broadcast control channel (BCCH), a paging control channel (PCCH), a common control channel (CCCH), a dedicated control channel (DCCH), and a multicast control channel (MCCH). The traffic channel includes a dedicated traffic channel (DTCH) and a multicast traffic channel (MTCH). The PCCH is a downlink channel that transfers paging information and is used when a network does not know a cell to which the UE belongs. The CCCH is used by the UE that does not have RRC connection to the network. The MCCH is a point-to-multipoint downlink channel used for transferring Multimedia Broadcast and Multicast Service (MBMS) control information from the network to the UE. The DCCH is a point-to-point bi-directional channel used by the UE having RRC connection that transfers dedicated control information between the UE and the network. The DTCH is a point-to-point channel used for only one UE in order to transfer user information that can exist at an uplink and a downlink. The MTCH is a point-to-multipoint downlink channel in order to transfer traffic data from the network to the UE.

In uplink connection between the logical channel and the transport channel, the DCCH may be mapped to the UL-SCH, the DTCH may be mapped to the UL-SCH, and the CCCH may be mapped to the UL-SCH. In downlink connection between the logical channel and the transport channel, the BCCH may be mapped to the BCH or the DL-SCH, the PCCH may be mapped to the PCH, the DCCH may be mapped to the DL-SCH, the DTCH may be mapped to the DL-SCH, the MCCH may be mapped to the MCH, and the MTCH may be mapped to the MCH.

FIG. 5 illustrates a structure of a physical channel in a wireless communication system to which the present invention can be applied.

Referring to FIG. 5, the physical channel transfers signaling and data through a radio resource configured with at least one subcarrier in a frequency domain and at least one symbol in a time domain.

One subframe having a length 1.0 ms is configured with a plurality of symbols. Specific symbol(s) (e.g., a first symbol of the subframe) of the subframe may be used for a PDCCH. The PDCCH transmits information (e.g., resource block) about a dynamically allocated resource and a Modulation and Coding Scheme (MCS).

Random Access Procedure

Hereinafter, a random access procedure providing in an LTE/LTE-A system will be described.

Because the UE does not have RRC Connection to the base station, when the UE performs initial access in an RRC idle state, the random access procedure is performed when performing an RRC connection re-establishment procedure.

In the LTE/LTE-A system, in a process of selecting a random access preamble (RACH preamble), the UE provides both a contention based random access procedure that randomly selects and uses one preamble and a non-contention based random access procedure in which a base station allocates to only a specific UE within a specific set.

FIG. 6 illustrates a contention based random access procedure in a wireless communication system to which the present invention can be applied.

(1) Msg 1 (Message 1)

First, the UE randomly selects one random access preamble (RACH preamble) at a set of random access preambles instructed through system information or a handover command and selects and transmits a physical RACH (PRACH) resource that can transmit the random access preamble.

The base station, having received a random access preamble from the UE decodes the preamble and acquires an RA-RNTI. The RA-RNTI related to the PRACH in which the random access preamble is transmitted is determined according to a time-frequency resource of a random access preamble in which a corresponding UE transmits.

(2) Msg 2 (Message 2)

The base station transmits a random access response addressed with the RA-RNTI acquired through a preamble on a message 1 to the UE. The random access response may include an RA preamble index/identifier, UL grant that notifies an uplink wireless resource, a Temporary Cell RNTI (TC-RNTI), and a time alignment command (TAC). The TAC is information that addresses a time synchronization value in which the base station sends to maintain uplink time alignment to the UE. The UE updates uplink transmission timing using the time synchronization value. When the UE updates time synchronization, the UE starts or restarts a time alignment timer. UL grant includes uplink resource allocation and transmit power command (TPC) used for transmission of a scheduling message (a message 3) to be described later. The TPC is used in determination of transmission power for a scheduled PUSCH.

After the UE transmits a random access preamble, the base station attempts reception of a random access response thereof within a random access response window addressed through system information or handover command, detects a masked PDCCH with the RA-RNTI corresponding to the PRACH, and receives a PDSCH addressed by the detected PDCCH. Random access response information may be transmitted in a form of a MAC packet data unit (MAC PDU), and the MAC PDU may be transferred through the PDSCH.

When the UE successfully receives a random access response having the same random access preamble index/identifier as that of a random access preamble transmitted to the base station, the UE stops monitoring of a random access response. However, until a random access response window is terminated, when the UE does not receive a random access response message or when the UE does not receive an effective random access response having the same random access preamble index as that of a random access preamble transmitted to the base station, it is regarded that reception of the random access response is failed and then the UE may retransmit the preamble.

(3) Msg 3 (Message 3)

When the UE receives an effective random access response, the UE processes each information included in the random access response. That is, the UE applies TAC and stores a TC-RNTI. Further, the UE transmits data stored at a buffer of the UE or newly generated data to the base station using UL grant.

In initial access of the UE, an RRC Connection Request generated in the RRC layer and transferred through the CCCH may be included and transmitted in the message 3, and in an RRC connection re-establishment procedure, an RRC Connection Re-establishment Request generated at the RRC layer and transferred through the CCCH may be included and transmitted in the message 3. Further, the message 3 may include a NAS access request message.

The message 3 should include an identifier of the UE. There are two methods of including an identifier of the UE. In a first method, when the UE already has an effective cell identifier (C-RNTI) allocated from a corresponding cell before the random access procedure, the UE transmits a cell identifier thereof through an uplink transmitting signal corresponding to the UL grant. However, when the UE does not have an effective cell identifier (C-RNTI) allocated from a corresponding cell before the random access procedure, the UE transmits a message 3 including a unique identifier (e.g., S-TMSI or random number) thereof. The unique identifier is generally longer than the C-RNTI.

When the UE transmits data corresponding to the UL grant, the UE starts a contention resolution timer.

(4) Msg 4 (Message 4)

When the base station receives the C-RNTI of a corresponding UE through the message 3 from the UE, the base station transmits a message 4 to the UE using the received C-RNTI. However, when the base station receives the unique identifier (i.e., S-TMSI or random number) from the UE through the message 3, the base station transmits the message 4 to the UE using a TC-RNTI allocated to the corresponding UE in a random access response. For example, the message 4 may include RRC Connection Setup.

The UE transmits data including an identifier thereof through UL grant included in the random access response and awaits an instruction of the base station in order to resolute contention. That is, in order to receive a specific message, the UE attempts reception of a PDCCH. There are two methods of receiving the PDCCH. As described above, in the message 3 transmitted to correspond to the UL grant, when an identifier thereof is a C-RNTI, the UE attempts reception of the PDCCH using the C-RNTI, and when the identifier is an unique identifier (i.e., S-TMSI or random number), the UE attempts reception of the PDCCH using a TC-RNTI included in the random access response. Thereafter, in the former case, before the contention resolution timer is terminated, when the UE receives the PDCCH through the C-RNTI thereof, the UE determines that a random access procedure has been normally performed and terminates the random access procedure. In the latter case, before the contention resolution timer is terminated, when the UE receives the PDCCH through the TC-RNTI, the UE determines data in which a PDSCH addressed by the PDCCH transfers. When a unique identifier thereof is included in the data, the UE determines that a random access procedure has been normally performed and terminates the random access procedure. The UE acquires a C-RNTI through the message 4 and the UE and the network transmit and receive a dedicated message using the C-RNTI.

In an operation in a non-contention based random access process, a random access procedure is terminated with only first message transmission and second message transmission unlike a contention-based random access process of FIG. 6. However, before the UE transmits a random access preamble to the base station with the message 1, the UE receives allocation of the random access preamble from the base station, transmits the allocated random access preamble to the base station with the message 1, and receives a random access response from the base station and thus the random access procedure is terminated.

Proximity Services (ProSe)

Due to increase of a user request for a Social Network Service (SNS), a request for recognition (i.e., discovery) between users/devices of a physically adjacent distance and a special application/service (i.e., proximity-based applications/service) occurs. In order to provide such a kind of service, the 3GPP mobile communication system works service requirements, system architecture, and solution.

A potential use case is as follows.

Commercial/social use

Network offloading

Public Safety

Integration of a current infrastructure service for guaranteeing continuity of user experience including reachability and mobility When E-UTRAN coverage (limited to a UE and frequency band designated to specific public stability under regional regulation and operator policy) does not exist, public safety A proximity-based application/service is provided via spectrum for public safety of LTE (i.e., E-UTRAN) or a WLAN, and it is assumed that discovery and communication between devices is performed under the control of a provider/network.

Terms that may be used in this document are defined as follows.

User Equipment (UE): The UE may be referred to as a term such as a terminal, Mobile Equipment (ME), and a device. Further, the UE may be a portable device such as a notebook computer, a mobile phone, a PDA, a smart phone, and a multimedia device or may be a non-portable device such as a PC and a vehicle mounting device.

Proximity Service (or ProSe Service or Proximity based Service): A service that can perform discovery between physically adjacent devices and mutual direct communication or communication through a base station or communication through a third device. In this case, user plane data are exchanged through a direct data path without though a 3GPP core network (e.g., EPC). This is referred to as a Device-to-Device (D2D) service.

Proximity: proximity is determined ("a UE is in proximity of another UE") when given proximity criteria are fulfilled. Proximity criteria can be different for discovery and communication.

ProSe Communication: a communication between two or more ProSe-enabled UEs in proximity by means of a ProSe Communication path. Unless explicitly stated otherwise, the term "ProSe Communication" refers to any/all of the following: ProSe E-UTRA Communication or ProSe-assisted WLAN direct communication between only two UEs, ProSe Group Communication or ProSe Broadcast Communication.

ProSe Direct Communication: A communication between two or more UEs in proximity that are ProSe-enabled, by means of user plane transmission using E-UTRA technology via a path not traversing any network node.

ProSe E-UTRA Communication: a ProSe Communication using a ProSe E-UTRA Communication path.

ProSe-assisted WLAN direct communication: a ProSe Communication using a ProSe-assisted WLAN direct communication path. This is also called EPC-assisted WLAN direct communication.

ProSe Communication path: the communication path supporting ProSe Communication. The communication path of a ProSe E-UTRA Communication (ProSe E-UTRA Communication path) could be established e.g. directly between the ProSe-enabled UEs using E-UTRA, or routed via local eNB(s). The communication path of a ProSe-assisted WLAN direct communication (ProSe-assisted WLAN direct communication path) is established directly between the ProSe-enabled UEs using WLAN.

EPC Path (or infrastructure data path): the user plane communication path through EPC.

ProSe direct discovery: A procedure employed by a ProSe-enabled UE to discover other ProSe-enabled UEs in its vicinity by using only the capabilities of the two UEs with E-UTRA technology.

EPC-level ProSe discovery: A ProSe Discovery procedure by which the EPC determines the proximity of two ProSe-enabled UEs and informs them of their proximity.

ProSe Discovery: A process that identifies that a UE that is ProSe-enabled is in proximity of another, using E-UTRA (with or without E-UTRAN) or EPC. That is, the ProSe Discovery is the ProSe direct discovery and/or the EPC-level ProSe discovery.

Open ProSe Discovery: is ProSe Discovery without explicit permission from the ProSe-enabled UE being discovered.

Restricted ProSe Discovery: ProSe Discovery that only takes place with explicit permission from the ProSe-enabled UE being discovered.

ProSe Group Communication: a one-to-many ProSe Communication, between more than two ProSe-enabled UEs in proximity, by means of a common communication path established between the ProSe-enabled UEs.

ProSe Broadcast Communication: a one-to-all ProSe E-UTRA Communication, between all authorized Public Safety ProSe-enabled UEs in proximity, by means of a common ProSe E-UTRA Communication Path established between these UEs.

ProSe UE-to-Network Relay: is a form of relay in which a ProSe-enabled Public Safety UE acts as a communication relay between a ProSe-enabled Public Safety UE and the ProSe-enabled network using E-UTRA.

Remote UE: A ProSe-enabled Public Safety UE, that is not served by E-UTRAN, and that communicates with a PDN via a ProSe UE-to-Network Relay.

ProSe UE-to-UE Relay: is a form of relay in which a ProSe-enabled Public Safety UE acts as a ProSe Communication relay between two other ProSe-enabled Public Safety UEs ProSe-enabled Network: a network that supports ProSe Discovery, ProSe Communication and/or ProSe-assisted WLAN direct communication. In the present description, the ProSe-enabled network is simply referred to as a network.

ProSe-enabled non-Public Safety UE: A UE that supports ProSe procedures but not capabilities specific to Public Safety.

ProSe-enabled Public Safety UE: A UE that the HPLMN has configured to be authorized for Public Safety use, and which is ProSe-enabled and supports ProSe procedures and capabilities specific to Public Safety. The UE may, but need not, have a USIM with one of the special access classes {12, 13, 14}.

ProSe-enabled UE: A UE that supports ProSe requirements and associated procedures. Unless explicitly stated otherwise, a Prose-enabled UE refers both to a ProSe-enabled non-Public Safety UE and a ProSe-enabled Public Safety UE. In the present description, the ProSe-enabled UE and/or ProSe-enabled Public Safety UE is simply referred to as a UE.

Proximity Services (ProSe) are services that can be provided by the wireless communication system (ex. 3GPP system) based on UEs being in proximity to each other.

FIGS. 7 and 8 illustrates ProSe architecture model in a wireless communication system to which the present invention can be applied.

FIG. 7 shows the high level view of the non-roaming inter-PLMN architecture. In FIG. 7, PLMN A is the HPLMN of UE A and PLMN B is the HPLMN of UE B.

FIG. 8 shows the high level view of the roaming architecture. In this figure, UE A uses a subscription of PLMN A and UE B uses a subscription of PLMN B; UE A is roaming in PLMN C while UE B is not roaming.

Referring to FIGS. 7 and 8, the ProSe architecture model comprises various components (i.e., functional entities, for example, network node(s) and UE). Hereinafter, various components included in the ProSe architecture model will be described.

The ProSe Function (i.e., the network node for the ProSe Function) is the logical function that is used for network related actions required for ProSe. The ProSe Function plays different roles for each of the features of ProSe. There may be only one logical ProSe Function in each PLMN that supports Proximity Services.

The ProSe Function consists of three main sub-functions that perform different roles depending on the ProSe feature:

a) Direct Provisioning Function (DPF) is used to provision the UE with necessary parameters in order use ProSe Direct Discovery and Prose Direct Communication. It is used to provision the UEs with PLMN specific parameters that allow the UE to use ProSe in this specific PLMN. For direct communication used for Public Safety DPF is also used to provision the UE with parameters that are needed when the UE is not served by E-UTRAN. For restricted ProSe Direct Discovery, it also generates and maintains the ProSe Discovery UE ID (PDUID).

b) Direct Discovery Name Management Function is used for open Prose Direct Discovery to allocate and process the mapping of ProSe Applications IDs and ProSe Application Codes used in ProSe Direct Discovery. It uses ProSe related subscriber data stored in HSS for authorisation for each discovery request. It also provides the UE with the necessary security material in order to protect discovery messages transmitted over the air. In restricted ProSe Direct Discovery, it also interacts with the Application Server via PC2 reference points for the authorization of the discovery requests.

c) EPC-level Discovery ProSe Function has a reference point towards the Application Server (PC2), towards other ProSe Functions (PC6), towards the HSS (PC4a) and the UE (PC3). The functionality includes the following:

Storage of ProSe-related subscriber data and/or retrieval of ProSe-related subscriber data from the HSS;

Authorization and configuration of the UE for EPC-level ProSe Discovery and EPC-assisted WLAN direct discovery and communication over PC3;

Storage of a list of applications that are authorized to use EPC-level ProSe Discovery and EPC-assisted WLAN direct discovery and communication;

Acting as location services client (SLP agent) to enable EPC-level ProSe Discovery;

Providing the UE with information to assist WLAN direct discovery and communications;

Handling of EPC ProSe User IDs and Application Layer User IDs;

Exchange of signalling with 3rd party Application Servers over PC2 reference point for application registration and identifier mapping;

Exchange of signalling with ProSe Functions in other PLMNs over PC6 reference points for sending proximity requests, proximity alerts and location reporting;

Optional support for functionality for requesting UE location via the HSS.

Any ProSe-enabled UE may support the following functions:

a) Exchange of ProSe control information between ProSe-enabled UE and the ProSe Function over PC3 reference point.

b) Procedures for open and restricted ProSe Direct Discovery of other ProSe-enabled UEs over PC5 reference point.

The ProSe-enabled Public Safety UE may support the following functions:

a) Procedures for one-to-many ProSe Direct Communication over PC5 reference point.

b) Procedures for one-to-one ProSe Direct Communication over PC5 reference point.

c) Procedures to act as a ProSe UE-to-Network Relay. The Remote UE communicates with the ProSe UE-to-Network Relay over PC5 reference point. The Prose UE-to-Network Relay uses layer-3 packet forwarding.

d) Exchange of control information between ProSe-UEs over PC5 reference point, e.g. for UE-to-Network Relay Discovery and Group Member Discovery.

e) Exchange of ProSe control information between another ProSe-enabled UE and the ProSe Function over PC3 reference point. In the ProSe UE-to-Network Relay case the Remote UE will send this control information over PC5 user plane to be relayed over the LTE-Uu interface towards the ProSe Function.

f) Configuration of parameters (e.g. including IP addresses, ProSe Layer-2 Group IDs, Group security material, radio resource parameters). These parameters can be pre-configured in the UE, or, if in coverage, provisioned by signalling over the PC3 reference point to the ProSe Function in the network.

The ProSe Application Server supports the following capability:

a) Storage of EPC ProSe User IDs: ProSe Function IDs, ProSe Discovery UE ID, metadata;

b) Mapping of Application Layer User IDs and EPC ProSe User IDs;

c) Mapping of RPAUID and PDUID for restricted ProSe Direct Discovery;

d) Maintaining permission information for the restricted ProSe Direct Discovery using RPAUIDs;

e) Allocation of the ProSe Restricted Code Suffix pool, if restricted Direct Discovery with application-controlled extension is used;

f) Allocation of the mask(s) for ProSe Restricted Code Suffix, if restricted Direct Discovery with application-controlled extension is used.

In addition to the function described in FIG. 1, in case of ProSe MME performs the following functions:

a) receives subscription information related to ProSe from the HSS;

b) provides indication to the E-UTRAN that the UE is authorized to use ProSe.

c) maintains a list of Remote UEs handled by a UE-to-Network Relay UE for the specific PDN and forwards the Remote UE information towards S-GW.

In addition to the function described in FIG. 1, the P-GW performs the following functions:

a) receives information related to the ProSe UE-to-Network Relay from the S-GW;

b) maintains a list of Remote UEs handled by the UE-to-Network Relay UE for the specific PDN.

In addition to the function described in FIG. 1, the S-GW performs the following functions:

a) receives information related to the ProSe UE-to-Network Relay from the MME;

b) maintains a list of Remote UEs handled by the UE-to-Network Relay UE for the specific PDN and forwards the Remote UE information towards P-GW.

Table 2 below summarizes reference points shown in FIGS. 7 and 8.

TABLE 2

| reference point | description) |
|---|---|
| PC1 | The reference point between the ProSe application in the UE and in the ProSe Application Server. It is used to define application level signalling requirements. This reference point is not specified in this release of the specification. |
| PC2 | The reference point between the ProSe Application Server and the ProSe Function. It is used to define the interaction between ProSe Application Server and ProSe functionality provided by the 3GPP EPS via ProSe Function (e.g. name translation) for ProSe Direct Discovery and EPC-level ProSe discovery. |
| PC3 | The reference point between the UE and the ProSe Function. PC3 relies on EPC user plane for transport (i.e. an "over IP" reference point). It is used to authorise ProSe Direct Discovery and EPC-level ProSe Discovery requests, and perform allocation of ProSe Application Codes/ProSe Restricted Codes corresponding to ProSe Application Identities used for ProSe Direct Discovery. It is used to define the authorisation policy per PLMN for ProSe Direct Discovery (for Public Safety and non-Public Safety) and communication (for Public Safety only) between UE and ProSe Function. |
| PC4a | The reference point between the HSS and ProSe Function. It is used to provide subscription information in order to authorise access for ProSe Direct Discovery and ProSe Direct Communication on a per PLMN basis. It is also used by the ProSe Function (i.e. EPC-level ProSe Discovery Function) for retrieval of EPC-level ProSe Discovery related subscriber data. |
| PC4b | The reference point between the Secure User Plane Location Architecture (SUPL) Location Platform (SLP) defined in Open Mobile Alliance (OMA) Arch Doc (AD) SUPL and the ProSe Function. It is used by the ProSe Function (i.e. EPC-level ProSe Discovery Function) (in the role of LCS client to query the SLP defined in OMA AD SUPL |
| PC5 | The reference point between ProSe-enabled UEs used for control and user plane for ProSe Direct Discovery, ProSe Direct Communication and ProSe UE-to-Network Relay.<br>The PC5 interface corresponds the sidelink which is UE to UE interface for sidelink communication, V2X sidelink communication and sidelink discovery. |
| PC6 | The reference point between ProSe Functions in different PLMNs (EPC-level ProSe Discovery) or between the ProSe Function in the HPLMN and the ProSe Function in a Local PLMN (ProSe Direct Discovery). With ProSe Direct Discovery this reference point is used for HPLMN control of ProSe service authorization. It is also used to authorise ProSe Direct Discovery requests, retrieve the Discovery Filter(s) corresponding ProSe Application ID name(s) and translate the ProSe Application Code to the ProSe Application ID Name. |

TABLE 2-continued

| reference point | description) |
|---|---|
| PC7 | The reference point between the ProSe Function in the HPLMN and the ProSe Function in the VPLMN. It is used for HPLMN control of ProSe service authorization. It is also used to authorise ProSe Direct Discovery requests, retrieve the Discovery Filter(s) corresponding ProSe Application ID name(s) and translate the ProSe Application Code to the ProSe Application ID Name. |
| S6a | In case of ProSe S6a is used to download ProSe related subscription information to MME during E UTRAN attach procedure or to inform MME subscription information in the HSS has changed. |
| S1-MME | In addition to the relevant functions described in Table 1 for S1-MME, in case of ProSe it is also used to convey the ProSe direct services authorization from MME to eNodeB. |

ProSe Direct Discovery

ProSe Direct Discovery is defined as the process that detects and identifies another UE in proximity using E-UTRA direct radio signals.

There are two types of ProSe Direct Discovery: open and restricted. Open is the case where there is no explicit permission that is needed from the UE being discovered, whereas restricted discovery only takes place with explicit permission from the UE that is being discovered.

ProSe Direct Discovery can be a standalone service enabler that could for example use information from the discovered UE for certain applications in the UE that are permitted to use this information e.g. "find a taxi nearby", "find me a coffee shop". Additionally depending on the information obtained ProSe Direct Discovery can be used for subsequent actions e.g. to initiate ProSe Direct Communication.

ProSe-enabled non-Public Safety UEs which have obtained authorization to participate in ProSe Direct Discovery procedures shall not continue in participating in ProSe Direct Discovery procedures as soon as they detect loss of E-UTRA coverage in the serving PLMN.

UE can use inter-PLMN discovery transmission based on the indication from the serving eNodeB or the provisioned radio resource on the UE.

The following models for ProSe Direct Discovery exist:
1) Model A ("I am here")

This model defines two roles for the ProSe-enabled UEs that are participating in ProSe Direct Discovery.

Announcing UE: The UE announces certain information that could be used by UEs in proximity that have permission to discover.

Monitoring UE: The UE that monitors certain information of interest in proximity of announcing UEs.

In this model the announcing UE broadcasts discovery messages at pre-defined discovery intervals and the monitoring UEs that are interested in these messages read them and process them.

This model is equivalent to "I am here" since the announcing UE would broadcast information about itself e.g. its ProSe Application Code in the discovery message.

The UE can act as "announcing UE" only in the carrier frequency signalled by the serving PLMN but may act as a "monitoring" UE also in the resources of the serving PLMN and Local PLMNs, when using Model A mode. When inter-PLMN discovery transmission is supported, the carrier frequency may be operated by a PLMN other than the serving PLMN.

Both open and restricted discovery types are supported by Model A.

2) Model B ("who is there?"/"are you there?")

This model when restricted discovery type is used, defines two roles for the ProSe-enabled UEs that are participating in ProSe Direct Discovery.

Discoverer UE: The UE transmits a request containing certain information about what it is interested to discover.

Discoveree UE: The UE that receives the request message can respond with some information related to the discoverer's request.

It is equivalent to "who is there/are you there" since the discoverer UE sends information about other UEs that would like to receive responses from, e.g. the information can be about a ProSe Application Identity corresponding to a group and the members of the group can respond.

When using Model B discovery, the discoverer UE and discoveree UE can announce in the carrier frequency signalled by the serving PLMN. When inter-PLMN discovery transmission is supported, the carrier frequency may be operated by a PLMN other than the serving PLMN. The discoverer UE and discoveree UE are allowed to monitor or announce in the serving PLMN and Local PLMNs when authorized.

Only restricted discovery type is supported by Model B.

The Public Safety discovery is considered restricted. The monitoring UE/discoverer UE needs to have authorization (such as through pre-provisioned parameters) to perform discovery of the appropriate service(s).

FIG. 9 illustrates a procedure for ProSe Direct Discovery (Model A) in a wireless communication system to which the present invention can be applied.

This procedure may be only applied for open and restricted ProSe Direct Discovery when the ProSe enabled UE is served by E-UTRAN.

1. Service authorisation for ProSe direct services is performed for ProSe Direct Discovery.

If the UE is authorised to announce:

2a. When the UE is triggered to announce, then it sends a discovery request for announcing to the ProSe Function in HPLMN for open ProSe Direct Discovery, or for restricted ProSe Direct Discovery. In addition, for restricted ProSe Direct Discovery, the ProSe Function further interacts with the ProSe Application server for the authorization of the discovery request.

3a. If the request is successful and is provided with ProSe Application Code/ProSe Restricted Code then it starts announcing on PC5 interface.

For ProSe restricted discovery and UE requests "on demand" announcing, ProSe Restricted Code may be provided to UE after this procedure. In this case, UE waits for the ProSe Restricted Code allocation and starts to announce the ProSe Restricted Code on PC5 after receiving it in Announcing Alert procedure.

If the UE is authorised to monitor:

2b. When the UE is triggered to monitor, it sends a discovery request for monitoring to the ProSe Function for open ProSe Direct Discovery, or for restricted ProSe Direct Discovery. In addition, for restricted ProSe Direct Discovery, the ProSe Function further interacts with the ProSe Application server for the authorization of the discovery request.

3b. If the request is successful and the UE is provided with a Discovery Filter consisting of ProSe Application Code(s)/ProSe Restricted Code(s) and/or ProSe Application Mask(s) it starts monitoring for these ProSe Application Codes/ProSe Restricted Codes on the PC5 interface.

4b. When the UE detects that one or more ProSe Application Code(s)/ProSe Restricted Code(s) that match the filter, it reports the ProSe Application Code(s)/ProSe Restricted Code(s) to the ProSe Function.

Non roaming direct discovery procedures cover the case where both the "announcing UE" and "monitoring UE" are served by their respective HPLMN. Roaming direct discovery procedures cover the other cases.

FIG. 10 illustrates a procedure for ProSe Direct Discovery (Model B) in a wireless communication system to which the present invention can be applied.

This procedure is applied for restricted ProSe Direct Discovery when the ProSe enabled UE is served by E-UTRAN.

1. Service authorisation for ProSe direct services is performed for ProSe Direct Discovery.

If the UE is authorised to perform restricted ProSe Direct Discovery, Model B, as a Discoveree UE, the following steps take place:

2a. When the UE is triggered to perform restricted ProSe Direct Discovery, Model B, it sends a discovery request to the ProSe Function in the HPLMN to obtain a ProSe Response Code. The ProSe Function further interacts with ProSe Application Server for the authorization of the discovery request.

3a. If the request is successful and the UE is provided with a ProSe Response Code and an associated Discovery Query Filter(s), then the UE starts monitoring for the ProSe Query Code on PC5 interface.

4a. If a received ProSe Query Code matches any of the Discovery Query Filter(s), the UE announces the associated ProSe Response Code on the PC5 interface.

If the UE is authorised to perform restricted ProSe Direct Discovery, Model B, as a Discoverer UE, the following steps take place:

2b. When the UE is triggered to perform restricted ProSe Direct Discovery, Model B, it sends a discovery request to the ProSe Function in the HPLMN for a ProSe Query Code. The ProSe Function further interacts with ProSe Application Server for the authorization of the discovery request.

3b. If the request is successful and the UE is provided with a ProSe Query Code and the Discovery Response Filter(s) consisting of ProSe Response Code(s) and ProSe Application Mask(s), the UE announces the ProSe Query Code on the PC5 interface.

4b. The UE starts to monitor on PC5 interface for any ProSe Response Code(s) that might match the Discovery Response Filter(s).

5b. When the UE detects a match for one or more ProSe Response Code(s), it reports the ProSe Response Code to the ProSe Function.

Non roaming direct discovery procedures cover the case where both the Discoveree UE and Discoverer UE are served by their respective HPLMN. Roaming direct discovery procedures cover the other cases.

Discovery Request

The Discovery Request is sent by the "announcing UE" or "monitoring UE" in order to be authorised to access the discovery resources and perform ProSe Direct Discovery.

FIG. 11 illustrates an Announce request procedure (roaming/inter-PLMN transmission) in a wireless communication system to which the present invention can be applied.

FIG. 11 shows an Announce request procedure for open discovery.

The UE is only allowed to announce in the carrier frequency signalled from serving PLMN. When inter-PLMN discovery transmission is supported, the carrier frequency may be operated by Local PLMN.

0. The UE is configured with the data structure of the ProSe Application IDs corresponding to HPLMN.

1. If the UE is authorised to announce in the PLMN operating the carrier frequency signalled from the serving PLMN (VPLMN or Local PLMN) and is triggered to announce, it shall establish a secure connection with the ProSe Function in HPLMN and it shall then send a Discovery Request (ProSe Application ID, UE Identity, announce command, Application ID, Discovery Entry ID, [Requested Timer], [metadata], [Announcing PLMN ID], [Application Level Container]) message for announcing. The ProSe Application ID indicates what the UE is interested to announce. The UE Identity is set to e.g. IMSI. The Application ID represents a unique identifier of the UE application that has triggered the transmission of the Discovery Request message. The Discovery Entry ID indicates whether this is a new request. The Requested Timer is an optional parameter and indicates the length of validity timer associated with the ProSe Application Code that the UE expects to receive from the ProSe Function in step 5. This request is always sent by the UE to the ProSe Function in HPLMN.

If dynamic metadata is used, the Discovery Request message also includes the metadata to be uploaded to the ProSe Function. Moreover, when the UE updates the metadata for a valid ProSe Application Code, the command is set to "metadata_update" in the Discovery Request message.

If inter-PLMN ProSe discovery transmission is supported, and the serving PLMN signalled carrier frequency is not operated by HPLMN or VPLMN, the UE shall include the PLMN ID of that carrier frequency in the Announcing PLMN ID.

If application-controlled extension is used, the Discovery Request message also includes the Application Level Container. The Application Level Container contains the request and any relevant information for the ProSe Application Server to assign a (set of) ProSe Application Code Suffix(es).

2. The ProSe Function checks for the authorization of the application represented by the Application ID. If there is no associated UE context, the ProSe Function shall check with HSS the authorisation for discovery and, if necessary, create a new context for this UE that contains the subscription parameters for this UE. The HSS provides the MSISDN (Mobile Station International ISDN Number) of the UE. The HSS also provides the VPLMN ID of where the UE is registered. When the Discovery Entry ID in the Discovery Request message does not contain a valid value for this UE, the ProSe Function will create a new discovery entry in the UE's context for this request, and will return the corresponding identifier in the Discovery Response message in step 5.

Home ProSe Function can retain the previously camped PLMN ID and associated ProSe Application Code for an operator configurable time when informed by HSS of a PLMN change. When the configuration timer expires, the previously camped PLMN ID and associated ProSe Application Code can be removed from the UE context.

2.a If the UE indicated it desired application-controlled extension by the inclusion of the Application Level Container, the ProSe Function sends an Auth Request (ProSe Application ID, Request Type, Application Level Container, Allowed number of suffixes) to the ProSe Application Server. The Request Type is set to "open discovery with application-controlled extension/announce". The Allowed Number of Suffixes indicates how many ProSe Restricted Code Suffixes the ProSe Application Server can assign for the UE. The ProSe Function locates the ProSe Application Server based on the Application ID.

2.b The ProSe Application Server returns an Auth Response (Response Type, ProSe Application Code Suffix pool) message. The ProSe Application Code Suffix pool contains the Suffix(es) allocated by the ProSe Application based on the inputs in step 2.a. The Response Type is set to "open discovery with application-controlled extension/announce ack".

The length of the ProSe Restricted Code Suffix is chosen by the ProSe Application Server from a set of allowable lengths (e.g. 8 bits, 24 bits, 48 bits). This choice is per application, so that all UEs announcing ProSe application Codes assigned for ProSe Application IDs from that Application ID use the same Suffix length (which may be zero if no application-controlled extension is allowed for this Application).

The ProSe Application Code Suffix pool needs to support the indication of a large number of or a range of ProSe Application Code Suffixes.

3. If the Discovery Request is authorised, then the HPLMN ProSe Function shall check whether the UE is authorized to use the ProSe Application ID contained in the Discovery Request. If the UE is authorised to use that ProSe Application ID, then the HPLMN ProSe Function shall inform the ProSe Function in VPLMN or Local PLMN if Announcing PLMN ID is included in step 1 with the Announce Authorisation (ProSe Application ID, ProSe Application Code, UE Identity, validity timer, Discovery Entry ID, [metadata]) message. The ProSe Application ID corresponds to the request from the UE, whereas the ProSe Application Code indicates the assigned code for this request. The request also includes the UE identity information e.g. IMSI or MSISDN and validity timer in order to allow the ProSe Function in VPLMN or Local PLMN to perform charging. The validity timer indicates for how long this ProSe Application Code is going to be valid; the ProSe Function in the HPLMN takes into account the Requested Timer parameter, if provided by the UE, when allocating the validity timer. If the ProSe Function in VPLMN or Local PLMN receives the same Discovery Entry ID in a subsequent Announce Authorization message, it updates the announcing UE's corresponding discovery entry replacing the existing ProSe Application Code and validity timer with the last received ones.

If dynamic metadata is used, the ProSe Function stores the metadata with the associated ProSe Application ID in the UE context, and allocates a corresponding Metadata Index to be included into the ProSe Application Code. Moreover, if the command is set to "metadata_update" in step 1, the ProSe Function only updates the Metadata Index portion of the ProSe Application Code, and keeps the rest unchanged. The metadata is also included in the Announce Authorisation message.

If application-controlled extension is used, the ProSe Function in the HPLMN allocates a ProSe Application Code Prefix (rather than a ProSe Application Code) based on the Application ID.

4. The ProSe Function in VPLMN or Local PLMN authorizes the UE to perform ProSe Direct Discovery announcing.

5. The ProSe Function in HPLMN shall respond to the UE with a Discovery Response (ProSe Application Code, validity timer, Discovery Entry ID) message. ProSe Application Code is provided by the ProSe Function in HPLMN and corresponds to the ProSe Application ID that was contained in the Discovery Request from the UE. The validity timer shall indicate for how long this ProSe Application Code is going to be valid. The UE will be authorised to announce this ProSe Application Code for the duration of validity timer and if it remains in the same PLMN.

If application-controlled extension is used, the ProSe Application Code is replaced by the ProSe Application Code Prefix, and the Discovery Response message also contains the ProSe Application Code Suffix pool.

To avoid interrupting the discovery procedure, if the UE changes PLMN but the validity timer of the Prose Application Code has not yet expired then the ProSe Function may allocate the same ProSe Application Code to the UE, with a validity timer set to the residual validity time of the validity timer not yet expired.

The UE appends a ProSe Application Code Suffix from the ProSe Application Code Suffix pool to the ProSe Application Code Prefix to form a ProSe Application Code. When the ProSe Application Code Suffix pool contains multiple suffixes, the UE may use different suffixes from the ProSe Application Code Suffix pool to form different ProSe Application Codes to announce, without having to contact the ProSe Function as long as the ProSe Application Code Prefix is valid.

6. The UE may start announcing the provided ProSe Application Code in the VPLMN or Local PLMN, using the radio resources authorised and configured by E-UTRAN to be used for ProSe as defined in RAN specifications.

If the validity timer associated with a ProSe Application Code expires (because the UE has not refreshed the corresponding Discovery Request within the duration of the validity timer), then the ProSe Function removes the entry related to that ProSe Application Code from the UE context.

FIG. 12 illustrates an Announce request procedure (roaming/inter-PLMN transmission) in a wireless communication system to which the present invention can be applied.

FIG. 12 shows an Announce request procedure for restricted discovery.

The UE is only allowed to announce in the carrier frequency signalled from serving PLMN. When inter-PLMN discovery transmission is supported, the carrier frequency may be operated by Local PLMN.

0. The user sets the permission for the restricted discovery using application layer mechanisms. In addition, the application client in the UE retrieves the PDUID and provides it to the ProSe Application Server. The ProSe Application Server allocates a RPAUID for that PDUID, stores the binding between the PDUID and the RPAUID and returns the RPAUID to the application client in the UE. The UE may optionally provide metadata to be associated with the RPAUID, and the ProSe Application Server stores the metadata. The application client in the UE stores the binding between the PDUID and its own RPAUID. If the application client in the UE intends to use the ProSe service, it triggers the UE to perform the announce procedure, providing its own RPAUID obtained by the ProSe Application Server.

It is expected that the application client in the UE will be able to retrieve the PDUID from the underlying ProSe Protocol layer.

1. If the UE is authorized to announce in the PLMN operating the carrier frequency signalled by the serving PLMN and is triggered by the application client to announce, it shall establish a secure connection with the ProSe Function in HPLMN and send a Discovery Request message (RPAUID, UE Identity, command=announce, Discovery Type, Application ID, Discovery Entry ID, Requested Discovery Timer, Application Level Container, Announcing Type, [Announcing PLMN ID]) for announcing. The RPAUID indicating what the UE is interested to announce was obtained in step 0. The UE Identity is set to IMSI. The Application ID represents a unique identifier of the UE application that has triggered the transmission of the Discovery Request message. The Discovery Type is set to "restricted discovery". The Discovery Entry ID indicates whether this is a new request. The Requested Discovery Timer is an optional parameter and indicates the length of validity timer associated with the ProSe Restricted Code that the UE expects to receive from the ProSe Function in step 6. When the Requested Discovery Timer is set to zero, the ProSe Function shall remove the discovery entry indicated by the Discovery Entry ID, and release the associated resources.

If the Requested Discovery Timer is included in step 1 and the value is set to zero, step 2 to step 3 are skipped.

If restricted Direct Discovery with application-controlled extension is used, the Discovery Request message also includes the Application Level Container. The Application Level Container contains the request and any relevant information (e.g. intent to use metadata indication in the suffix) for the ProSe Application Server to assign a (set of) ProSe Restricted Code Suffix(es). The Discovery Type is set to "restricted discovery with application-controlled extension".

Announcing type can be set to "on demand" to indicate the "on demand" announcing is requested by UE for the indicated application.

If inter-PLMN ProSe discovery transmission is supported, and the serving PLMN signalled carrier frequency is not operated by HPLMN or VPLMN, the UE shall include the PLMN ID of that carrier frequency in the Announcing PLMN ID.

2. The ProSe Function checks for the authorization of the application represented by the Application ID. If there is no associated UE context, the ProSe Function shall check with HSS the authorisation for discovery and, if necessary, create a new context for this UE that contains the subscription parameters for this UE. The HSS provides the MSISDN of the UE. The HSS also provides the serving PLMN ID of where the UE is registered. When the Discovery Entry ID in the Discovery Request message does not contain a valid value for this UE, the ProSe Function creates a new discovery entry in the UE's context for this request, and returns the corresponding identifier in the Discovery Response message in step 6.

2.a Optionally, the ProSe Function sends an Auth Request (RPAUID, Request Type) to the ProSe Application Server. The ProSe Function locates the ProSe Application Server based on the Application ID. The Request Type is set to "restricted discovery/announce".

If restricted Direct Discovery with application-controlled extension is used, the Auth Request message also includes the Allowed Number of Suffixes. The Allowed Number of Suffixes indicates how many suffixes the ProSe Application Server can provide to the UE. The Request Type is set to "restricted discovery with application-controlled extension/announce".

2.b The ProSe Application Server returns an Auth Response (PDUID(s), Response Type) message. The PDUID(s) corresponds to the RPAUID stored in the ProSe Application Server. The Response Type is set to "restricted discovery/announce ack".

If restricted Direct Discovery with application-controlled extension is used, the Auth Response message also includes the ProSe Restricted Code Suffix pool. The ProSe Restricted Code Suffix pool contains the Suffix(es) allocated by the ProSe Application based on the inputs in step 2.a. The Response Type is set to "restricted discovery with application-controlled extension/announce ack".

The ProSe Function verifies that at least one of the received PDUID(s) belongs to the requesting UE.

Whether steps 2.a and 2.b are executed depends on ProSe Function configuration, or policy regarding the specific Application Server. For example, if the ProSe Function can already verify the ownership locally, it does not have to perform the two steps.

The length of the ProSe Restricted Code Suffix is chosen by the ProSe Application Server from a set of allowable lengths (e.g. 8 bits, 24 bits, 48 bits). This choice is per application, so that all UEs announcing ProSe Restricted Codes assigned for Restricted ProSe Application User IDs from that Application ID use the same Suffix length (which may be zero if no application-controlled extension is allowed for this Application).

The ProSe Restricted Code Suffix pool needs to support the indication of a large number of or a range of ProSe Restricted Code Suffixes.

3. The ProSe Function in HPLMN allocates a ProSe Restricted Code and the associated validity timer. The ProSe Restricted Code corresponds to the RPAUID that was contained in the Discovery Request from the UE. The validity timer shall indicate for how long this ProSe Restricted Code is going to be valid. The UE will be authorised to announce this ProSe Restricted Code for the duration of validity timer and if it remains in the same PLMN. The ProSe Function stores the RPAUID, the ProSe Restricted Code and the associated validity timer in the user context.

If restricted Direct Discovery with application-controlled extension is used, the ProSe Function in the HPLMN allocates a ProSe Restricted Code Prefix (rather than a ProSe Restricted Code) based on the Application ID and/or the Restricted ProSe App User ID.

If restricted ProSe Direct Discovery with "on demand" announcing has been requested, the ProSe Function determines if "on demand" announcing is authorized and enabled based on the Application ID and operator's policy. If "on demand" announcing is authorized and enabled, the ProSe Function stores the RPAUID, the ProSe Restricted Code with the associated validity timer and the Announcing Enabled indicator in the user context.

It is up to the policy in the ProSe Function whether to allocate the same ProSe Restricted Code for a set of several RPAUIDs or different ProSe Restricted Codes for the different RPAUIDs.

If "on demand" announcing is authorized and enabled in step 3 and there is no ongoing monitoring request, steps 4 and 5 are not executed.

4. If the Discovery Request is authorized and verified, the HPLMN ProSe Function shall inform the ProSe Function in VPLMN or Local PLMN if Announcing PLMN ID is included in step 1 with the Announce Authorization (RPAUID, Application ID, validity timer, ProSe Restricted Code, UE Identity, Discovery Entry ID) message. The RPAUID and Application ID correspond to the request from the UE, whereas the ProSe Restricted Code indicates the assigned code for this request. The request shall include the UE identity information e.g. IMSI or MSISDN and validity timer in order to allow the ProSe Function in VPLMN or Local PLMN to perform charging. The validity timer indicates for how long this ProSe Restricted Code is going to be valid. If the ProSe Function in VPLMN or Local PLMN receives the same Discovery Entry ID in a subsequent Announce Authorization message, it updates the announcing UE's corresponding discovery entry replacing the existing ProSe Restricted Code and validity timer with the last received ones.

If restricted Direct Discovery with application-controlled extension is used, the ProSe Restricted Code is replaced by the ProSe Restricted Code Prefix, and the Announce Authorization message also contains the ProSe Restricted Code Suffix pool.

If the Requested Discovery Timer is included in step 1 and the value is set to zero, the ProSe Function in HPLMN shall inform the ProSe Function in VPLMN or Local PLMN with the validity timer set to zero. The ProSe Function removes the discovery entry indicated by the Discovery Entry ID, and releases the associated resources.

5. The ProSe Function in VPLMN or Local PLMN authorizes the UE to perform Restricted ProSe Discovery announcing.

6. The ProSe Function in HPLMN responds to the UE with a Discovery Response (ProSe Restricted Code, validity timer, Discovery Entry ID) message.

If restricted Direct Discovery with application-controlled extension is used, the ProSe Restricted Code is replaced by the ProSe Restricted Code Prefix, and the Discovery Response message also contains the ProSe Restricted Code Suffix pool.

If the "on demand" announcing is authorized and enabled in step 3 and there is no ongoing monitoring request, the ProSe Function in HPLMN does not provide a ProSe Restricted Code to the UE and responds to the UE with a Discovery Response (validity timer, Announcing Enabled indicator, Discovery Entry ID) message.

If the Requested Discovery Timer is included in step 1 and the value is set to zero, the validity timer in the Discovery Response message is set to zero.

The announcing UE may receive the same ProSe Restricted Code as a result of different Announce Request procedures.

The UE appends a ProSe Restricted Code Suffix from the ProSe Restricted Code Suffix pool to the ProSe Restricted Code Prefix to form a ProSe Restricted Code. When the ProSe Restricted Code Suffix pool contains multiple suffixes, the UE may use different suffixes from the ProSe Restricted Code Suffix pool to form different ProSe Restricted Codes to announce, without having to contact the ProSe Function as long as the ProSe Restricted Code Prefix is valid.

7. The UE may start announcing the provided ProSe Restricted Code in the VPLMN or Local PLMN, using the radio resources authorised and configured by E-UTRAN to be used for ProSe as defined in RAN specifications.

If the "on demand" announcing is used and ProSe Function does not provide a ProSe Restricted Code to the UE in step 6, the UE waits for an Announcing Alert Request message from the ProSe Function in HPLMN before starting to announce over the air.

The ProSe Protocol layer in the UE may inform the application client that it has started announcing.

If the validity timer associated with a ProSe Restricted Code expires (because the UE has not refreshed the corresponding Discovery Request within the duration of the validity timer), then the ProSe Function removes the entry related to that ProSe Restricted Code from the UE context.

Method of Selecting Frequency for Discovery Transmission in Proximity Based Service The operations related to the inter-PLMN sidelink discovery transmission are summarized as follows.

The serving eNB may signal the frequencies and PLMN IDs on which the sidelink discovery transmissions are allowed to be performed. The UE can read SIB19 of the other carriers to acquire the resources for sidelink discovery transmission.

For the coordinated inter-PLMN case, the serving eNB can provide sidelink discovery resource information for other carriers using dedicated signalling or broadcast signalling.

The UE is configured with the authorized PLMN for sidelink discovery transmission by higher layers For Public Safety sidelink discovery the allowed frequency is pre-configured in the UE. The frequency can be the same frequency as Public Safety sidelink communication.

The UE is not expected to perform any PLMN change for the purpose of inter-PLMN sidelink discovery transmission.

That is, the eNB (the serving eNB) that services the UE transmits a frequency list in which the UE may use in sidelink discovery transmission (i.e., announcing) and ID(s) of the PLMN that provides the frequency list to the UE through system information (e.g., SIB19). Thereby, the UE may use a frequency received from the eNB in sidelink discovery transmission without change of a PLMN. Detailed contents of such inter-PLMN sidelink discovery transmission may be incorporated by reference in this document with reference to a document such as 3GPP TS 23.303, TS 36.331, and TS 24.334.

As can be seen in FIGS. 7 and 8, in an Announce request (roaming/inter-PLMN transmission)—open/restricted discovery procedure, in order to reflect inter-PLMN sidelink discovery transmission support, the UE transmits information (i.e., announcing PLMN ID) about a PLMN that provides a resource to use in sidelink discovery transmission to a HPLMN Prose Function at step 1. This is ID information of a PLMN in which the UE is to perform a discovery transmission operation.

In this case, in the PLMN, when there are a plurality of frequencies in which the UE may use in sidelink discovery transmission, a method is not defined that can determine whether announcing should be performed using which frequency of the plurality of frequencies.

Particularly, when a network instead of each UE determines such a frequency in a centralized form, if the UE performs discovery announcing using a frequency of another PLMN instead of the HPLMN, there is a drawback that the ProSe Function within the HPLMN cannot currently know information about a frequency in which the UE may currently use for sidelink discovery transmission. Further, a mechanism is not determined in which the UE may perform determination. Accordingly, a mechanism is required in which the UE determines frequency information for using in sidelink discovery transmission.

In the present invention, in a mobile communication system such as a 3GPP Evolved Packet System (EPS), when performing announcing in a PLMN in which the UE using an enhanced ProSe (eProSe), which is a Proximity-based service operates a plurality of frequencies for direct discovery, a mechanism that selects/determines one frequency of the plurality of frequencies is suggested.

The frequency may be a frequency for direct discovery announcing. The present invention may be applied to a case in which the UE is not roaming as well as a case in which the UE is roaming.

In a description of the present invention, the ProSe Function means a network node that can perform the foregoing ProSe Function operation and may be referred to as a ProSe Function node.

1) The Network Selects/Determines a Frequency for Announcing

The UE receives a frequency(s) (i.e., a candidate frequency list) available in sidelink discovery transmission and information (e.g., PLMN Identifier (ID) (i.e., announcing PLMN ID) about a PLMN(s) operating/providing the frequency(s) from the serving eNB.

Here, when an available frequency is two or more, the UE may transmit the announcing PLMN ID and the candidate frequency list to the ProSe Function within the HPLMN.

Further, the candidate frequency list includes a plurality of available frequencies, and frequencies included in the candidate frequency list may be operated by different PLMNs. That is, the serving eNB may provide at least one PLMN ID and at least one available frequency operating on each PLMN basis to the UE.

In this case, the UE may transmit the announcing PLMN ID and the candidate frequency list to the ProSe Function within the HPLMN through the Discovery Request message.

In this case, only when a PLMN in which the UE is to perform announcing is not a Home PLMN, the UE may provide the candidate frequency list to the ProSe Function within the HPLMN.

Alternatively, the ProSe Function of a corresponding PLMN (i.e., PLMN operating a frequency that belongs to the candidate frequency list) may have the candidate frequency list. In such a case, the UE may not separately provide the candidate frequency list.

a) The ProSe Function within the HPLMN determines a PLMN operating a resource (i.e., frequency) in which the UE is to use for announcing through an announcing PLMN ID and may transmit the candidate frequency list to a ProSe Function of corresponding at least one PLMN (may be or may not be a VPLMN).

In this case, the ProSe Function within the HPLMN may transmit the candidate frequency list to the corresponding at least one PLMN using an Announce Authorization message.

For example, when the announcing PLMN ID in which the UE receives from the serving eNB is A and when the UE receives an available frequency list including frequencies a, b, and c operating in a PLMN A, the UE may transmit an announcing PLMN ID {A} and a candidate frequency list {a, b, c} to the ProSe Function within the HPLMN. In this case, the ProSe Function within the HPLMN may transmit the candidate frequency list {a, b, c} to the Prose Function within the PLMN A.

In another example, the UE may receive a candidate frequency list in which an announcing PLMN ID is A and B and including frequencies a, b, and c operating in the PLMN A and frequencies d and e operating in the PLMN B from the serving eNB. In this case, the UE may transmit an announcing PLMN ID {A, B} and a candidate frequency list {a, b, c, d, e} to the ProSe Function within the HPLMN. The ProSe Function within the HPLMN may transmit the candidate frequency list {a, b, c} to the Prose Function within the PLMN A and transmit a candidate frequency list {d, e} to the Prose Function within the PLMN B.

The ProSe Function of the PLMN, having received the candidate frequency list from the HPLMN may select/determine a frequency in which the UE is to use in sidelink discovery transmission.

In this case, the ProSe Function of the PLMN, having received the candidate frequency list from the HPLMN may select (at least one) frequency in which the UE is to use in sidelink discovery transmission in consideration of the following at least one.

i) Random selection. For example, (at least one) frequency may be randomly selected.

ii) Load-balancing selection. For example, (at least one) frequency having a lowest load may be selected based on an Inter-PLMN ProSe Discovery frequency usage rate in which the serving eNB reports.

iii) Operator configuration. For example, an operator may designate a frequency to a specific application, and in this case, (at least one) frequency corresponding to a corresponding application may be selected based on an Application ID included in a Discovery Request message.

iv) ProSe Application Type. For example, applications may be classified into a plurality of service types based on a kind of a service, and in this case, (at least one) frequency may be selected according to a service type of a corresponding application based on an Application ID included in a Discovery Request message.

v) Partial information about subscription of the UE received from the ProSe Function within the HPLMN. For example, (at least one) frequency may be selected based on MSISDN and IMSI of the UE.

The ProSe Function of the PLMN, having received the candidate frequency list from the HPLMN may transmit (at least one) frequency selected based on the above contents to the ProSe Function within the HPLMN.

In this case, the ProSe Function of the PLMN, having received the candidate frequency list from the HPLMN may transmit (at least one) frequency selected using an Announce Authorization (Auth) Ack message to the ProSe Function within the HPLMN.

The ProSe Function within the HPLMN may receive the selected (at least one) frequency information and transfer the selected (at least one) frequency information to the UE.

As described above, when the ProSe Function within the HPLMN transmits a candidate frequency list to the ProSe Function of each of a plurality of PLMNs, the ProSe Function within the HPLMN may receive a frequency selected from ProSe Functions of each PLMN. In this case, the ProSe Function within the HPLMN may select a frequency of a received plurality of frequencies.

In this case, the ProSe Function within the HPLMN may provide the selected (at least one) frequency information to the UE using a Discovery Response message.

The UE may use (i.e., perform an announcing operation in a corresponding frequency) a frequency according to the received (at least one) frequency information in sidelink discovery transmission.

The foregoing method a) will be described in detail with reference to the following drawings.

FIG. 13 illustrates an announcing Request procedure for a UE discovery operation according to an exemplary embodiment of the present invention.

Hereinafter, for convenience of description, only portions different from FIG. 11 are described, and although it is not described, a detailed description of FIG. 11 may be combined as a description of FIG. 13.

Further, although not illustrated in FIG. 13, the UE receives a PLMN ID(s) and an available frequency(s) (i.e., a candidate frequency list) allowed to perform sidelink discovery transmission from the serving eNB.

The UE receives a configuration of a data structure of a ProSe Application ID(s) corresponding to the HPLMN (S1301).

THE UE transmits a Discovery Request message for announcing to a ProSe Function within the HPLMN (S1302).

Here, the Discovery Request message may include an announcing PLMN ID including at least one PLMN ID(s) allowed to perform sidelink discovery transmission and a candidate frequency list including at least one available frequency(s).

When an available frequency is two or more, the UE may transmit an announcing PLMN ID and a candidate frequency list to the ProSe Function within the HPLMN.

The ProSe Function within the HPLMN checks the authority of an application identified by an Application ID (S1303).

The ProSe Function within the HPLMN transmits an Authorization (Auth) Request message to a Prose Application Server (S1304) and receives an Auth Response message from the Prose Application Server in response thereto (S1305).

The ProSe Function within the HPLMN transmits an Announce Authorization message to the ProSe Function of a PLMN (e.g., VPLMN or Local PLMN) corresponding to an announcing PLMN ID included in a Discovery Request (S1306).

Here, the Announce Authorization message may include a candidate frequency list included in the Discovery Request.

In this case, when there are a plurality of announcing PLMN IDs included in the Discovery Request, the ProSe Function within the HPLMN may transmit a frequency list operating by each PLMN among frequencies within the candidate frequency list to each PLMN.

The PLMN(s), having received the candidate frequency list select(s) (at least one) frequency in the received candidate frequency list (S1307).

In this case, the PLMN(s), having received the candidate frequency list may select a carrier frequency according to the foregoing method.

The PLMN(s), having received the candidate frequency list transmit(s) an Announce Authorization Acknowledgement message to the ProSe Function within the HPLMN (S1308).

Here, the Announce Authorization Acknowledgement message may include carrier frequency information (i.e., Selected Frequency) that indicates (at least one) carrier frequency selected in the received candidate frequency list to the ProSe Function within the HPLMN.

The ProSe Function within the HPLMN transmits a Discovery Response message to the UE (S1309).

Here, the Discovery Response message may include carrier frequency information (i.e., Selected Frequency) that indicates (at least one) carrier frequency received at step S1308.

The UE starts sidelink discovery transmission (i.e., announcing) on the indicated (at least one) carrier frequency in the received carrier frequency information (S1310).

That is, frequency information that should use in the announcing PLMN in which the UE receives from the ProSe Function within the HPLMN is related to (or a connection relation) ProSe Application Code information to be transmitted (e.g., transmitted within a Discovery Response) together with the frequency information, and the UE may announce the ProSe Application Code using a frequency corresponding to the received frequency information.

FIG. 14 illustrates an announcing request procedure for a UE discovery operation according to an exemplary embodiment of the present invention.

Hereinafter, for convenience of description, only portions different from FIG. 12 are described, and although it is not described, a detailed description of FIG. 12 may be combined as a description of FIG. 14.

Further, although not illustrated in FIG. 14, the UE receives a PLMN ID(s) and an available frequency(s) (i.e., candidate frequency list) allowed to perform sidelink discovery transmission from the serving eNB.

The user sets permission for a limited discovery using an application layer mechanism (S1401).

The UE transmits a Discovery Request message for announcing to the ProSe Function within the HPLMN (S1402).

Here, the Discovery Request message may include an announcing PLMN ID including at least one PLMN ID(s) allowed to perform sidelink discovery transmission and a candidate frequency list including at least one available frequency(s).

When an available frequency is two or more, the UE may transmit an announcing PLMN ID and a candidate frequency list to the ProSe Function within the HPLMN.

The ProSe Function within the HPLMN checks the authority of an application identified by the Application ID (S1403).

The ProSe Function within the HPLMN transmits an Auth Request message to the Prose Application Server (S1404) and receives an Auth Response message from the Prose Application Server in response thereto (S1405).

The ProSe Function within the HPLMN allocates a ProSe Restricted Code and an associated validity timer (S1406).

The ProSe Function within the HPLMN transmits an Announce Authorization message to the ProSe Function of a PLMN (e.g., VPLMN or Local PLMN) corresponding to an announcing PLMN ID included in a Discovery Request (S1407).

Here, the Announce Authorization message may include a candidate frequency list included in the Discovery Request.

In this case, when there are a plurality of the announcing PLMN IDs included in the Discovery Request, the ProSe Function within the HPLMN may transmit a frequency list operating by each PLMN among frequencies within the candidate frequency list to each PLMN.

The PLMN(s), having received the candidate frequency list select(s) (at least one) frequency in the received candidate frequency list (S1408).

In this case, the PLMN(s), having received the candidate frequency list may select a carrier frequency according to the foregoing method.

The PLMN(s), having received the candidate frequency list transmit(s) an Announce Authorization Acknowledgement message to the ProSe Function within the HPLMN (S1409).

Here, the Announce Authorization Acknowledgement message may include carrier frequency information (i.e., Selected Frequency) that indicates (at least one) selected carrier frequency in the received candidate frequency list to the ProSe Function within the HPLMN.

The ProSe Function within the HPLMN transmits a Discovery Response message to the UE (S1410).

Here, the Discovery Response message may include carrier frequency information (i.e., Selected Frequency) that indicates (at least one) carrier frequency received at step S1409.

The UE starts sidelink discovery transmission (i.e., announcing) on (at least one) indicated carrier frequency in the received carrier frequency information (S1411).

That is, frequency information in which the UE should use in the announcing PLMN that receives from the ProSe Function within the HPLMN is related to (or connection relation) ProSe Application Code information that transmits (e.g., transmits within Discovery Response) together with the frequency information, and the UE may announce the ProSe Application Code using a frequency corresponding to the received frequency information.

When a PLMN in which the UE is to announce is a Home PLMN, the ProSe Function within the HPLMN may select/determine (at least one) frequency in which the UE is to use in sidelink discovery transmission according to the foregoing method (i.e., in consideration of at least one of i) to v)). The ProSe Function within the HPLMN may transmit the selected (at least one) frequency information to the UE through a Discovery Response message. The UE may use a frequency according to the received (at least one) frequency information in sidelink discovery transmission.

b) The ProSe Function of the PLMN in which announcing (i.e., sidelink discovery transmission) is performed does not select/determine a frequency, but the ProSe Function of the Home PLMN of the UE may always select/determine a frequency.

In this case, the ProSe Function within the HPLMN may select a frequency in which the UE is to use in sidelink discovery transmission in consideration of the following at least one.

i) Subscription information of the UE. For example, (at least one) frequency may be selected based on MSISDN and IMSI of the UE.

ii) ProSe Application type. For example, applications may be classified into a plurality of service types based on a kind of a service, and in this case, (at least one) frequency may be selected according to a service type a corresponding application based on an Application ID included in the Discovery Request message.

iii) Configuration of a HPLMN Operator. For example, the operator may designate a frequency of a specific application, and in this case, (at least one) frequency corresponding to a corresponding application may be selected based on an Application ID included in the Discovery Request message.

Alternatively, information necessary for selecting/determining a frequency may be acquired from the ProSe Function of at least one PLMN in which announcing is performed by the UE. This information may correspond to the following at least one.

iv) Random Selection parameter. In this case, the Home ProSe Function may randomly select (at least one) frequency based on a Random Selection parameter.

v) Mapping table of Application and available frequency. In this case, the Home ProSe Function may select an Application ID included in the Discovery Request message and mapped (at least one) frequency using a mapping table. In this case, the mapping table may be previously configured by an announcing PLMN operator.

vi) Restricted applications. That is, an application list that cannot be used may be predetermined on a frequency basis. In this case, the Home ProSe Function may select available (at least one) frequency in an Application ID included in the Discovery Request message using Restricted applications.

vii) Periodic Load information about a specific frequency. For example, in this case, the Home ProSe Function may select (at least one) frequency having a lowest load.

The ProSe Function within the HPLMN may select a frequency used in announcing by the UE based on at least one of the information i)-iii) and/or at least one of the information iv)-vii).

c) The ProSe Function of the Home PLMN of the UE and the ProSe Function of the PLMN in which announcing is performed may together determine a frequency to use in announcing.

In this case, information in which two ProSe Functions are to exchange/use may include at least one information used at the a) and b).

Further, the following at least one information may be further included.

i) A ProSe Frequency usage status and rate report of the serving eNB operating a frequency included in candidate frequency list. In this case, for example, the ProSe Function within the HPLMN may receive a ProSe Frequency usage status and rate report of a Serving eNB from a ProSe Function of each PLMN. The ProSe Function within the HPLMN may select (at least one) frequency having a lowest load based on the ProSe Frequency usage status and rate report.

ii) The number of the UE served by the serving eNB operating a frequency included in the candidate frequency list. In this case, for example, the ProSe Function within the HPLMN may receive the number of the UE in which the serving eNB serves from a ProSe Function of each PLMN. The ProSe Function within the HPLMN may select (at least one) frequency in which the number of UE served by the serving eNB is smallest based on the number.

iii) Frequency preference for a ProSe service (e.g., Discovery/Announcing of the UE) of an Operator. For example, the operator may designate frequency preference of a specific ProSe service. In this case, (at least one) frequency may be selected according to a service of a corresponding application based on an Application ID included in the Discovery Request message.

That is, the ProSe Function of the Home PLMN of the UE transmits the above-described information (i.e., at least one information used in a and b and/or the i)-iii)) to the ProSe Function of the PLMN in which announcing is performed, and the ProSe Function of the PLMN in which announcing is performed may select a frequency used in announcing. In contrast, the ProSe Function of the PLMN in which announcing is performed transmits the above-described information (i.e., at least one information used at a) and b) and/or the i)-iii)) to the ProSe Function of the Home PLMN of the UE, and the ProSe Function of the Home PLMN of the UE may select a frequency used in announcing.

The foregoing methods b) and c) will be described in detail with reference to the following drawings.

FIG. 15 illustrates an announcing request procedure for a UE discovery operation according to an exemplary embodiment of the present invention.

Hereinafter, for convenience of description, only portions different from FIG. 11 are described, and although it is not described, a detailed description of FIG. 11 may be combined as a description of FIG. 15.

Further, although not illustrated in FIG. 15, the UE receives a PLMN ID(s) allowed to perform sidelink discovery transmission from the serving eNB and an available frequency(s) (i.e., a candidate frequency list).

The UE receives a configuration of a data structure of a ProSe Application ID(s) corresponding to the HPLMN (S1501).

The UE transmits a Discovery Request message for announcing to the ProSe Function within the HPLMN (S1502).

Here, the Discovery Request message may include an announcing PLMN ID including at least one PLMN ID(s) allowed to perform sidelink discovery transmission and a candidate frequency list including at least one available frequency(s).

When an available frequency is two or more, the UE may transmit an announcing PLMN ID and a candidate frequency list to the ProSe Function within the HPLMN.

The ProSe Function within the HPLMN checks the authority of an application identified by an Application ID (S1503).

The ProSe Function within the HPLMN transmits an Auth Request message to the Prose Application Server (S1504) and receives an Auth Response message from the Prose Application Server in response thereto (S1505).

The ProSe Function within the HPLMN transmits an Announce Authorization message to a ProSe Function of a PLMN (e.g., VPLMN or Local PLMN) corresponding to an announcing PLMN ID included in a Discovery Request (S1506).

The PLMN(s) transmits an Announce Authorization Acknowledgement message to the ProSe Function within the HPLMN (S1507).

The ProSe Function within the HPLMN selects (at least one) frequency in a candidate frequency list (S1508).

In this case, the ProSe Function within the HPLMN may select a carrier frequency according to the foregoing methods b) or c).

The ProSe Function within the HPLMN transmits a Discovery Response message to the UE (S1509).

Here, the Discovery Response message may include a carrier frequency information (i.e., Selected Frequency) that indicates (at least one) carrier frequency selected at step S1508.

The UE starts sidelink discovery transmission (i.e., announcing) on the indicated (at least one) carrier frequency in the received carrier frequency information (S1510).

That is, frequency information in which the UE should use in an announcing PLMN received from the ProSe Function within the HPLMN may be related (or connection relation) to ProSe Application Code information transmitted (e.g., transmitted within a Discovery Response) together with the frequency information, and the UE may announce the ProSe Application Code using a frequency corresponding to the received frequency information.

FIG. 16 illustrates an announcing Request procedure for a UE discovery operation according to an exemplary embodiment of the present invention.

Hereinafter, for convenience of description, only portions different from FIG. 12 are described, and although it is not described, a detailed description of FIG. 12 may be combined as a description of FIG. 16.

Further, although not illustrated in FIG. 16, the UE receives a PLMN ID(s) and an available frequency(s) (i.e., a candidate frequency list) allowed to perform sidelink discovery transmission from the serving eNB.

The user sets permission for limited discovery using an application layer mechanism (S1601).

The UE transmits a Discovery Request message for announcing to the ProSe Function within the HPLMN (S1602).

Here, the Discovery Request message may include an announcing PLMN ID including at least one PLMN ID(s) allowed to perform sidelink discovery transmission and a candidate frequency list including at least one available frequency(s).

When an available frequency is two or more, the UE may transmit an announcing PLMN ID and a candidate frequency list to the ProSe Function within the HPLMN.

The ProSe Function within the HPLMN checks the authority of an application identified by an Application ID (S1603).

The ProSe Function within the HPLMN transmits an Auth Request message to the Prose Application Server (S1604) and receives an Auth Response message from the Prose Application Server in response thereto (S1605).

The ProSe Function within the HPLMN allocates a ProSe Restricted Code and an associated validity timer (S1606).

The ProSe Function within the HPLMN transmits an Announce Authorization message to the ProSe Function of a PLMN (e.g., VPLMN or Local PLMN) corresponding to an announcing PLMN ID included in a Discovery Request (S1607).

The PLMN(s) transmits an Announce Authorization Acknowledgement message to the ProSe Function within the HPLMN (S1608).

The ProSe Function within the HPLMN selects (at least one) frequency in a candidate frequency list (S1609).

In this case, the ProSe Function within the HPLMN may select a carrier frequency according to the foregoing method.

The ProSe Function within the HPLMN transmits a Discovery Response message to the UE (S1610).

Here, the Discovery Response message may include carrier frequency information (i.e., Selected Frequency) that indicates (at least one) carrier frequency selected at step S1609.

The UE starts sidelink discovery transmission (i.e., announcing) on the indicated (at least one) carrier frequency in the received carrier frequency information (S1611).

That is, frequency information in which the UE should use in an announcing PLMN received from the ProSe Function within the HPLMN may be related (or connection relation) to a ProSe Application Code information transmitted (e.g., transmitted within a Discovery Response) together with the frequency information, and the UE may announce the ProSe Application Code using a frequency corresponding to the received frequency information.

In the foregoing description, a method in which the ProSe Function selects/determines one frequency per PLMN has been described, but a plurality of frequencies that can perform announcing at one PLMN may be selected/determined and may be provided to the UE.

In this case, the HPLM Prose Function may provide ProSe Application Code information using when announcing in a corresponding frequency per each frequency to each UE or may provide commonly available ProSe Application Code information on a plurality of frequencies of the PLMN to the UE (e.g., using a Discovery Response message).

2) The UE Selects/Determines a Frequency for Announcing

The UE receives information (e.g., PLMN Identifier (ID) (i.e., announcing PLMN ID) about a frequency(s) (i.e., a candidate frequency list) that may be used in sidelink discovery transmission from the serving eNB and PLMN(s) that operating/providing the frequency(s) (i.e., a candidate frequency list).

Here, when an available frequency is two or more, the UE may select/determine (at least one) frequency based on various information. In this case, the UE may select (at least one) frequency to use in sidelink discovery transmission in consideration of at least one of the following information.

i) Random selection. For example, (at least one) frequency may be randomly selected.

ii) Operator configuration. For example, an operator may designate a frequency to a specific application, and in this case, (at least one) frequency corresponding to a corresponding application may be selected based on an Application ID included in the Discovery Request message.

iii) ProSe Application Type. For example, applications may be classified into a plurality of service types based on a service kind, and in this case, (at least one) frequency may be selected according to a service type of a corresponding application based on an Application ID included in Discovery Request message.

iv) Mapping table of an Application and an available frequency. In this case, the UE may select an Application ID and (at least one) mapped frequency using a mapping table.

v) Restricted applications. That is, an application list that cannot be used on a frequency basis may be predetermined. In this case, the UE may select (at least one) frequency that may be used in an Application ID using Restricted applications.

The foregoing i)-v) information may be previously set to the UE or the UE may acquire the foregoing i)-v) information from a network (e.g., a ProSe Function).

In the foregoing description, a method in which the ProSe Function selects/determines one frequency per PLMN has been described, but the UE may select/determine a plurality of frequencies that can perform announcing in one PLMN.

In this way, when selecting/determining a plurality of frequencies for announcing, if the UE transmits a Discovery Request message in order to acquire ProSe Application Code information from the ProSe Function, information that indicates that the selected frequency is the plural and/or the number of selected frequencies may be notified to the ProSe Function. Accordingly, the ProSe Function may provide each ProSe Application Code information using when announcing in a corresponding frequency per each frequency to the UE or may provide ProSe Application Code information commonly available on a plurality of frequencies of the PLMN to the UE (e.g., using a Discovery Response message).

FIG. 17 illustrates an announcing Request procedure for a UE discovery operation according to an exemplary embodiment of the present invention.

Hereinafter, for convenience of description, only portions different from FIG. 11 are described, and although it is not described, a detailed description of FIG. 11 may be combined as a description of FIG. 17.

Further, although not illustrated in FIG. 17, the UE receives a PLMN ID(s) and an available frequency(s) (i.e., candidate frequency list) allowed to perform sidelink discovery transmission from the serving eNB.

The UE receives a configuration of a data structure of a ProSe Application ID(s) corresponding to the HPLMN (S1701).

The UE selects (at least one) frequency in the candidate frequency list (S1702).

In this case, the UE may select a carrier frequency according to the above-described method.

The UE transmits a Discovery Request message for announcing to the ProSe Function within the HPLMN (S1703).

Here, the Discovery Request message may include carrier frequency information that indicates (at least one) carrier frequency selected by the UE.

The ProSe Function within the HPLMN checks the authority of an application identified by an Application ID (S1704).

The ProSe Function within the HPLMN transmits an Auth Request message to a Prose Application Server (S1705) and receives an Auth Response message from the Prose Application Server in response thereto (S1706).

The ProSe Function within the HPLMN transmits an Announce Authorization message to the ProSe Function of a PLMN (e.g., VPLMN or Local PLMN) corresponding to an announcing PLMN ID included in a Discovery Request (S1707).

The PLMN(s) transmit(s) an Announce Authorization Acknowledgement message to the ProSe Function within the HPLMN (S1708).

The ProSe Function within the HPLMN transmits a Discovery Response message to the UE (S1709).

The UE starts sidelink discovery transmission (i.e., announcing) on (at least one) carrier frequency selected at step S1702 (S1710).

That is, the UE may announce a ProSe Application Code received from the ProSe Function within the HPLMN using the selected frequency.

FIG. 18 illustrates an announcing Request procedure for a UE discovery operation according to an exemplary embodiment of the present invention.

Hereinafter, for convenience of description, only portions different from FIG. 12 are described, and although it is not described, a detailed description of FIG. 12 may be combined as a description of FIG. 18.

Further, although not illustrated in FIG. 18, the UE receives a PLMN ID(s) and an available frequency(s) (i.e., a candidate frequency list) allowed to perform sidelink discovery transmission from the serving eNB.

The user sets permission for limited discovery using an application layer mechanism (S1801).

The UE selects (at least one) frequency in the candidate frequency list (S1802).

In this case, the UE may select a carrier frequency according to the above-described method.

The UE transmits a Discovery Request message for announcing to the ProSe Function within the HPLMN (S1803).

Here, the Discovery Request message may include carrier frequency information that indicates (at least one) carrier frequency selected by the UE.

The ProSe Function within the HPLMN checks the authority of an application identified by an Application ID (S1804).

The ProSe Function within the HPLMN transmits an Auth Request message to the Prose Application Server (S1805)

and receives an Auth Response message from the Prose Application Server in response thereto (S1806).

The ProSe Function within the HPLMN allocates a ProSe Restricted Code and an associated validity timer (S1807).

The ProSe Function within the HPLMN transmits an Announce Authorization message to the ProSe Function of a PLMN (e.g., VPLMN or Local PLMN) corresponding to an announcing PLMN ID included in a Discovery Request (S1808).

The PLMN(s) transmit(s) an Announce Authorization Acknowledgement message to the ProSe Function within the HPLMN (S1809).

The ProSe Function within the HPLMN transmits a Discovery Response message to the UE (S1810).

The UE starts sidelink discovery transmission (i.e., announcing) on (at least one) carrier frequency selected at step S1802 (S1811).

That is, the UE may announce a ProSe Application Code received from the ProSe Function within the HPLMN using the selected frequency.

In the foregoing exemplary embodiment of the present invention, a method in which 1) the network selects/determines a frequency for announcing and a method in which 2) the UE selects/determines a frequency for announcing was divided and described, but methods 1) and 2) may be combined and used. For example, the UE may determine at least one frequency according to the method of 2) among available frequencies received from the serving eNB. The UE may transmit at least one determined frequency as a candidate frequency list to the network, as in the method 1), and the network may finally determine at least one frequency according to the method 1) and transmit the at least one frequency to the UE.

FIG. 19 illustrates a method of supporting a discovery operation of an UE according to an exemplary embodiment of the present invention.

Referring to FIG. 19, a network node (e.g., a network node within a Home Public Land Mobile Network (HPLMN) of the UE) receives a Discovery Request message from the UE (S1901).

Here, the Discovery Request message may include a candidate frequency list including an available plurality of carrier frequencies for announcing by the UE and a PLMN Identifier (ID) of each of the carrier frequencies included in the candidate frequency list. Further, information described in FIG. 11 and/or FIG. 12 may be included in the Discovery Request message.

The network node transmits a Discovery Response message to the UE (S1902).

Here, the Discovery Response message may include carrier frequency information that indicates a carrier frequency selected for announcing by the UE among carrier frequencies included in the candidate frequency list. Further, information described in FIG. 11 and/or FIG. 12 may be included in the Discovery Request message.

Here, a carrier frequency used for announcing by the UE may be selected using 1) a method (e.g., a method according to FIGS. 13 to 16) in which the network selects/determines a frequency for announcing.

For example, when a PLMN ID within an announcing PLMN ID corresponds to the HPLMN of the UE, a carrier frequency for announcing by the UE may be selected by a network node within the HPLMN of the UE.

In this case, a carrier frequency for announcing by the UE may be selected based on at least one of a random selection method, a load-balancing based selection method, an operator configuration, a ProSe application type, or subscription information of the UE.

In another example, when a PLMN ID within an announcing PLMN ID does not correspond to the HPLMN of the UE, the network node may transmit an Announce Authorization message including the announcing PLMN ID and the candidate frequency list to a network node within the PLMN corresponding to the PLMN ID. The network node may receive an Announce Authorization Acknowledgement message including carrier frequency information selected for announcing by the UE from a network node within the PLMN corresponding to the PLMN ID.

In this case, a carrier frequency for announcing by the UE may be selected based on at least one of a random selection method, a load-balancing based selection method, an operator configuration, a ProSe application type, or subscription information of the UE by the network node within the PLMN corresponding to the PLMN ID.

Further, a carrier frequency for announcing by the UE may be selected based on at least one of subscription information of the UE, a ProSe Application type, or an HPLMN Operator configuration.

Further, the network node may receive information necessary for frequency selection from the network node within the PLMN corresponding to the PLMN ID. A carrier frequency for announcing by the UE may be selected based on information necessary for frequency selection.

In this case, information necessary for frequency selection may include at least one of a Random Selection parameter, a mapping table of an Application and an available frequency, application information that cannot be used on a frequency basis, or periodic load information about a specific frequency.

Further, information necessary for frequency selection may include at least one of a Frequency usage status and a rate report of a Serving eNodeB servicing in a frequency included in a candidate frequency list, the number of the UE served by the serving eNB, or frequency preference for announcing of the UE of an Operator.

Further, as a carrier frequency for announcing by the UE, one frequency or a plurality of frequencies may be selected per PLMN.

In this case, as a carrier frequency for announcing by the UE, when a plurality of frequencies may be selected per PLMN, a ProSe Application Code used for identifying announcing by the UE may be differently allocated or commonly allocated on each frequency basis of a plurality of frequencies.

In order to search for neighboring another UE, the UE may perform announcing on a carrier frequency indicated by carrier frequency information received at step S1902.

FIG. 20 illustrates a method in which the UE performs Discovery according to an exemplary embodiment of the present invention.

Referring to FIG. 20, the UE receives a candidate frequency list including an available plurality of carrier frequencies for announcing and an announcing PLMN ID including a PLMN Identifier (ID) of each of carrier frequencies included in the candidate frequency list from a serving eNodeB (S2001).

The UE selects a carrier frequency for announcing among carrier frequencies included in the candidate frequency list (S2002).

Here, a carrier frequency used for announcing may be selected using 2) the method (e.g., the method according to FIGS. 17 and 18) in which the UE selects/determines a frequency for announcing.

For example, a carrier frequency for announcing may be selected based on at least one of a random selection method, a load-balancing based selection method, an operator configuration, a ProSe application type, or subscription information of the UE.

Further, as a carrier frequency for announcing, one or a plurality of frequencies may be selected per PLMN.

In this case, as a carrier frequency for announcing, when a plurality of frequencies are selected per PLMN, a ProSe Application Code used to identify announcing may be differently allocated or commonly allocated on each frequency basis of a plurality of frequencies.

The UE transmits carrier frequency information that indicates a carrier frequency selected at step S2002 to a network node within a Home Public Land Mobile Network (HPLMN) of the UE (S2003).

In this case, in order to transmit carrier frequency information, a Discovery Request message may be used. Further, information described in FIG. 11 may be included in the Discovery Request message.

In order to search for neighboring another UE on a carrier frequency selected at step S2002, the UE performs announcing (S2004).

Device to which the Present Invention can be Applied

FIG. 21 is a block diagram illustrating a configuration of a communication device according to an exemplary embodiment of the present invention.

Referring to FIG. 21, a wireless communication system includes a network node 2110 and a plurality of UEs 2120.

The network node 2110 includes a processor 2111, a memory 2112, and a communication module 2113. The processor 2111 implements a function, a process and/or a method suggested in FIGS. 1 to 20. Layers of a wired/wireless interface protocol may be implemented by the processor 2111. The memory 2112 is connected to the processor 2111 to store various information for driving the processor 2111. The communication module 2113 is connected to the processor 2111 to transmit and/or receive a wired/wireless signal. The network node 2110 may be, for example, a base station, an MME, a HSS, a SGW, a PGW, a SCEF, a SCS/AS, and a Prose Function. Particularly, when the network node 2110 is a base station, the communication module 2113 may include a radio frequency (RF) unit for transmitting/receiving a wireless signal.

The terminal 2120 includes a processor 2121, a memory 2122, and a communication module (or RF unit) 2123. The processor 2121 implements a function, a process and/or a method suggested in FIGS. 1 to 20. Layers of a wireless interface protocol may be implemented by the processor 2121. The memory 2122 is connected to the processor 2121 to store various information for driving the processor 2121. The communication module 2123 is connected to the processor 2121 to transmit and/or receive a wireless signal.

The memories 2112 and 2122 may exist at the inside or the outside of the processors 2111 and 2121 and may be connected to the processors 2111 and 2121, respectively, by well-known various means. Further, the network node 2110 (a case of a base station) and/or the UE 2120 may have a single antenna or multiple antennas.

FIG. 22 is a block diagram illustrating a configuration of a communication device according to an exemplary embodiment of the present invention.

Particularly, FIG. 22 is a block diagram specifically illustrating the UE of FIG. 21.

Referring to FIG. 22, the UE may include a processor (or a digital signal processor (DSP)) 2210, a RF module (or RF unit) 2235, a power management module 2205, an antenna 2240, a battery 2255, a display 2215, a keypad 2220, a memory 2230, a Subscriber Identification Module (SIM) card 2225 (this element may be selected), a speaker 2245, and a microphone 2250. The UE may include a single antenna or multiple antennas.

The processor 2210 implements a function, a process and/or a method suggested in FIGS. 1 to 20. A layer of a wireless interface protocol may be implemented by the processor 2210.

The processor 2210 is connected to the processor 2210 and stores information related to operation of the processor 2210. The memory 2230 may exist at the inside or the outside of the processor 2210 and may be connected to the processor 2210 by well-known various means.

The user inputs, for example, instruction information such as a phone number by pressing (touching) a button of the keypad 2220 or by voice activation using the microphone 2250. The processor 2210 processes to perform an appropriate function such as reception of such instruction information and calling with a phone number. Operational data may be extracted from the SIM card 2225 or the memory 2230. Further, for user recognition and convenience, the processor 2210 may display instruction information or driving information on the display 2215.

The RF module 2235 is connected to the processor 2210 to transmit and/or receive an RF signal. In order to start communication, the processor 2210 transfers, for example, instruction information to the RF module 2235 in order to transmit a wireless signal constituting voice communication data. The RF module 2235 is configured with a receiver and a transmitter in order to receive and transmit a wireless signal. The antenna 2240 performs a function of transmitting and receiving a wireless signal. When receiving a wireless signal, the RF module 2235 may transfer a signal in order to process by the processor 2210 and may convert a signal with a base band. The processed signal may be converted to audible or readable information output through the speaker 2245.

In the foregoing exemplary embodiments, constituent elements and characteristics of the present invention are combined in a predetermined form. Unless phrases explicitly represent, it should be considered that each constituent element or characteristic is selective. Each constituent element or characteristic may be executed in a form that does not combined with other constituent elements or characteristics. Further, by combining some configurations and/or characteristics, an exemplary embodiment of the present invention may be configured. The order of operations described in exemplary embodiments of the present invention may be changed. Some configurations or characteristics of any exemplary embodiment may be included in another exemplary embodiment or may be replaced with a configuration or a characteristic corresponding to another exemplary embodiment. It will become apparent that claims that are not in an explicit cited relation in the claims may configure an exemplary embodiment by combination and may be included in new claim by amendment after filing.

An exemplary embodiment of the present invention may be implemented by various means, for example, hardware, firmware, software, or combinations thereof. When implementing by hardware, an exemplary embodiment of the present invention may be implemented by at least one application specific integrated circuits (ASICs), digital signal processors (DSPs), digital signal processing devices (DSPDs), programmable logic devices (PLDs), field programmable gate arrays (FPGAs), a processor, a controller, a microcontroller, and a microprocessor.

When implementing by firmware or software, an exemplary embodiment of the present invention may be implemented in a form of a module, procedure, and function that perform the foregoing function or operation. A software code may be stored at a memory to be driven by a processor. The memory may be located at the inside or the outside of the processor and may transmit and receive data to and from the processor by already known various means.

It will become apparent to a person of ordinary skill in the art that the present invention may be embodied in different specific forms without deviating from essential features of the present invention. Therefore, it should be considered that the detailed description is not to limit the present invention but to illustrate it. Thus, it is intended that the present invention cover the modifications and variations of this invention provided they come within the scope of the appended claims and their equivalents.

INDUSTRIAL APPLICABILITY

An exemplary embodiment of the present invention mainly describes an example applied to a 3GPP LTE/LTE-A system, but can be applied to various wireless communication systems other than the 3GPP LTE/LTE-A system.

What is claimed is:

1. A method in which a network node supports a discovery operation of a User Equipment (UE) in a wireless communication system, the method comprising:
    receiving, by a network node within a Home Public Land Mobile Network (HPLMN) of the UE, a Discovery Request message from the UE,
    wherein the Discovery Request message includes a candidate frequency list including an available plurality of carrier frequencies for announcing the UE and an announcing PLMN Identifier (ID) including a PLMN ID of each of the carrier frequencies included in the candidate frequency list; and
    transmitting, by the network node within the HPLMN, a Discovery Response message to the UE,
    wherein the Discovery Response message includes carrier frequency information that indicates a carrier frequency selected per a PLMN corresponding to the PLMN ID for announcing the UE among the carrier frequencies included in the candidate frequency list.

2. The method of claim 1, wherein, when the PLMN ID within the announcing PLMN ID corresponds to the HPLMN the carrier frequency for announcing the UE is selected by the network node within the HPLMN.

3. The method of claim 2, wherein the carrier frequency for announcing the UE is selected based on at least one of a random selection method, a load-balancing based selection method, an operator configuration, a ProSe application type, or subscription information of the UE.

4. The method of claim 1, further comprising:
    when the PLMN ID within the announcing PLMN ID does not correspond to the HPLMN, transmitting an Announce Authorization message including the announcing PLMN ID and the candidate frequency list to a network node within the PLMN corresponding to the PLMN ID; and
    receiving an Announce Authorization Acknowledgement message including carrier frequency information selected for announcing the UE from the network node within the PLMN corresponding to the PLMN ID.

5. The method of claim 4, wherein the carrier frequency for announcing the UE by the network node within the PLMN corresponding to the PLMN ID is selected based on at least one of a random selection method, a load-balancing based selection method, an operator configuration, a ProSe application type, or subscription information of the UE.

6. The method of claim 1, wherein the carrier frequency for announcing the UE is selected based on at least one of subscription information of the UE, a ProSe Application type, or a HPLMN Operator configuration.

7. The method of claim 6, further comprising:
    receiving information necessary for frequency selection from a network node within the PLMN corresponding to the PLMN ID,
    wherein the carrier frequency for announcing the UE is selected based on information necessary for frequency selection.

8. The method of claim 7, wherein the information necessary for frequency selection includes at least one of a Random Selection parameter, a mapping table of an Application and available frequency, application information that cannot be used on each frequency basis, or periodic load information of a specific frequency.

9. The method of claim 7, wherein the information necessary for frequency selection includes at least one of a Frequency usage status and rate report of a Serving eNodeB servicing in a carrier frequency included in the candidate frequency list, the number of UE served by the Serving eNodeB, or frequency preference for announcing the UE of an Operator.

10. The method of claim 1, wherein one or a plurality of frequencies are selected per the PLMN as the carrier frequency for announcing the UE.

11. The method of claim 10, wherein a ProSe Application Code used for identifying announcing the UE is differently allocated or commonly allocated on each frequency basis of the plurality of frequencies, when as the carrier frequency for announcing the UE, a plurality of frequencies are selected per the PLMN.

12. The method of claim 1, wherein announcing is performed to search for neighboring another UE by the UE on a carrier frequency indicated by the carrier frequency information.

13. A method in which a User Equipment (UE) performs discovery in a wireless communication system, the method comprising:
    transmitting, by the UE, a Discovery Request message to a network node within a Home Public Land Mobile Network (HPLMN) of the UE,
    wherein the Discovery Request message includes a candidate frequency list including an available plurality of carrier frequencies for announcing the UE and an announcing PLMN Identifier (ID) including a PLMN ID of each of the carrier frequencies included in the candidate frequency list; and
    receiving, by the UE, a Discovery Response message from the network node within the HPLMN,
    wherein the Discovery Response message includes carrier frequency information that indicates a carrier frequency selected per a PLMN corresponding to the PLMN ID for announcing the UE among the carrier frequencies included in the candidate frequency list.

14. The method of claim 13, wherein, when the PLMN ID within the announcing PLMN ID corresponds to the HPLMN, the carrier frequency for announcing the UE is selected by the network node within the HPLMN.

15. The method of claim 14, wherein the carrier frequency for announcing the UE is selected based on at least one of a random selection method, a load-balancing based selection method, an operator configuration, a ProSe application type, or subscription information of the UE.

16. The method of claim 13, wherein the carrier frequency for announcing the UE is selected by a network node within the PLMN corresponding to the PLMN ID based on at least one of a random selection method, a load-balancing based selection method, an operator configuration, a ProSe application type, or subscription information of the UE.

17. The method of claim 13, wherein the carrier frequency for announcing the UE is selected based on at least one of subscription information of the UE, a ProSe Application type, or a HPLMN Operator configuration.

18. The method of claim 13, wherein one or a plurality of frequencies are selected per the PLMN as the carrier frequency for announcing the UE.

19. The method of claim 18, wherein a ProSe Application Code used for identifying announcing the UE is differently allocated or commonly allocated on each frequency basis of the plurality of frequencies, when as the carrier frequency for announcing the UE, a plurality of frequencies are selected per the PLMN.

20. The method of claim 13, wherein announcing is performed to search for neighboring another UE by the UE on a carrier frequency indicated by the carrier frequency information.

* * * * *